US009573121B2

(12) United States Patent
Garcia-Martinez

(10) Patent No.: US 9,573,121 B2
(45) Date of Patent: Feb. 21, 2017

(54) MESOPOROUS ZEOLITE CATALYST SUPPORTS

(71) Applicant: Rive Technology, Inc., Boston, MA (US)

(72) Inventor: Javier Garcia-Martinez, Alicante (ES)

(73) Assignee: Rive Technology, Inc., Monmouth Junction, NJ (US)

( * ) Notice: Subject to any disclaimer, the term of this patent is extended or adjusted under 35 U.S.C. 154(b) by 432 days.

(21) Appl. No.: 14/075,661

(22) Filed: Nov. 8, 2013

(65) Prior Publication Data

US 2014/0128246 A1 May 8, 2014

Related U.S. Application Data

(60) Provisional application No. 61/723,965, filed on Nov. 8, 2012.

(51) Int. Cl.
*B01J 29/14* (2006.01)
*B01J 29/04* (2006.01)
*B01J 35/00* (2006.01)
*C10G 47/16* (2006.01)
*C10G 47/18* (2006.01)
*C10G 47/20* (2006.01)

(52) U.S. Cl.
CPC .......... *B01J 29/146* (2013.01); *B01J 29/043* (2013.01); *B01J 29/044* (2013.01); *B01J 29/045* (2013.01); *B01J 35/002* (2013.01); *B01J 35/0013* (2013.01); *C10G 47/16* (2013.01); *C10G 47/18* (2013.01); *C10G 47/20* (2013.01); *C10G 2300/1059* (2013.01); *C10G 2300/1074* (2013.01)

(58) Field of Classification Search
CPC ....... B01J 29/043; B01J 29/044; B01J 29/045; B01J 29/146; C10G 47/14; C10G 47/16; C10G 47/18; C10G 47/20
See application file for complete search history.

(56) References Cited

U.S. PATENT DOCUMENTS

| 5,290,744 | A | 3/1994 | Degnan, Jr. et al. |
| 7,589,041 | B2 | 9/2009 | Ying et al. |
| 2006/0223893 | A1* | 10/2006 | Vogt ............... C10G 2/334 518/716 |
| 2007/0272593 | A1 | 11/2007 | Stockwell et al. |

(Continued)

FOREIGN PATENT DOCUMENTS

DK WO 2010097224 A2 * 9/2010 ............ B01J 29/035

OTHER PUBLICATIONS

Wark (Growth and reactivity of zinc and cadmium oxide nanoparticles in zeolites, Microporous Materials, 8, 1997:241-253).*

(Continued)

*Primary Examiner* — Jun Li
(74) *Attorney, Agent, or Firm* — Hovey Williams LLP

(57) ABSTRACT

Compositions and methods for preparing a catalyst composition containing mesoporous materials are described herein. In particular, various embodiments described herein relate to the preparation of catalytic compositions containing a mesoporous zeolite and one or more catalytic nanoparticles dispersed therein. In various embodiments described herein, such catalyst compositions can be used in various catalytic conversion processes, such as hydrocracking.

26 Claims, 12 Drawing Sheets

(56) References Cited

U.S. PATENT DOCUMENTS

2010/0196263 A1* 8/2010 Garcia-Martinez .... B01J 29/084
                                                423/713
2011/0108459 A1  5/2011 Simon et al.
2012/0055846 A1* 3/2012 Domokos ............. B01J 29/084
                                                208/111.35

OTHER PUBLICATIONS

Qinghu Tang et al., Characterizations of Cobalt Oxide Nanoparticles within Faujasite Zeolites and the Formation of Metallic Cobalt, American Chemical Society, State Key Laboratory of Physical Chemistry of Solid Surfaces, Department of Chemistry, Xiamen University, Xiamen 361005, China, Chem. Mater. 2004, 16, pp. 1967-1976.

C. Ramos Moreira et al., Nature and Location of Cerium in Ce-loaded Y Zeolites as Revealed by HRTEM and Spectroscopic Techiniques, Dept. Inorganic Chemistry, Universidade Federal do Rio de Janeiro, Brazil, Microporous and Mesoporous Materials 100 (2007), pp. 276-286.

Paul R. Robinson et al., Hydrotreating and Hydrocracking: Fundamentals, Practical Advances in Petroleum Processing, Springer New York, 2006, pp. 177-218.

* cited by examiner

MESOPOROUS ZEOLITE CATALYST SUPPORTS

RELATED APPLICATIONS

This application claims the priority benefit under 35 U.S.C. §119(e) of U.S. Provisional Patent Application Ser. No. 61/723,965 entitled "MESOPOROUS ZEOLITE CATALYST SUPPORTS," filed Nov. 8, 2012, the entire disclosure of which is incorporated herein by reference.

BACKGROUND

1. Field

One or more embodiments of the present invention relate to catalyst compositions and methods for preparing catalyst compositions from mesoporous zeolites. More particularly, embodiments described herein relate to the preparation of catalyst compositions comprising a catalyst support formed from a mesoporous zeolite.

2. Description of Related Art

Zeolites are used in many industrial processes, including as catalysts and catalyst supports in various conversion reactions. However, when used as catalyst supports and subjected to severe reaction conditions during these various processes, a significant portion of the catalytic material that is incorporated within the zeolites is eventually lost as it migrates out of the zeolite and agglomerates on its surface, thus decreasing its catalytic functionality. Even though advances have been made in the art of catalyst compositions, improvements are still needed to produce superior catalyst compositions.

SUMMARY

One embodiment of the present invention concerns a method for modifying a catalyst composition. This particular method comprises (a) incorporating one or more catalytic nanoparticles into a mesoporous zeolite to thereby form an initial catalytic zeolite, wherein the mesoporous zeolite has a total 20 to 80 Å diameter mesopore volume of at least 0.05 cc/g; and (b) heating at least a portion of the initial catalytic zeolite at a temperature of at least 150° C. to thereby form a heat-modified catalytic zeolite, wherein at least 20 weight percent of the total amount of the catalytic nanoparticles associated with the heat-modified catalytic zeolite are located within the mesopores of the heat-modified catalytic zeolite.

Another embodiment of the present invention concerns a method for making a catalyst composition. This particular method comprises (a) subjecting a mesoporous zeolite having a total 20 to 80 Å diameter mesopore volume of at least 0.05 cc/g to ion-exchange with one or more ions of a catalyst metal to form an ion-exchanged catalytic zeolite, wherein the ion exchange incorporates at least a portion of the catalyst ions into the mesopores of the mesoporous zeolite; and (b) contacting the ion-exchanged catalytic zeolite with one or more pH additives to thereby form a catalytic zeolite, wherein at least 20 weight percent of the total amount of the catalyst metal associated with the catalytic zeolite is located within the mesopores of the catalytic zeolite.

Still another embodiment of the present invention concerns a hydrocracking process. This hydrocracking process comprises contacting a hydrocarbon-containing feedstock with a catalyst composition in the presence of hydrogen under hydrocracking conditions to thereby produce a hydrocracked product. The catalyst composition comprises a mesoporous zeolite and catalytic nanoparticles. In addition, at least 20 weight percent of the total amount of the catalytic nanoparticles associated with the catalyst composition are located within the mesopores of the mesoporous zeolite.

Still yet another embodiment of the present invention concerns a catalyst composition comprising a mesoporous zeolite and catalytic nanoparticles. The mesoporous zeolite has a total 20 to 80 Å diameter mesopore volume of at least 0.05 cc/g and at least 20 weight percent of the total amount of the catalytic nanoparticles associated with the catalyst composition are located within the mesopores of the zeolite. In addition, at least 10 weight percent of the catalytic nanoparticles within the mesopores of the zeolite have an average particle size of at least 2 nm as measured using high magnification transmission electron microscopy ("TEM").

Still yet another embodiment of the present invention concerns a method for modifying a catalyst composition. The method comprises (a) incorporating one or more catalytic nanoparticles into mesopores of a mesoporous zeolite to thereby form an initial catalytic zeolite, wherein the mesoporous zeolite has a total 20 to 80 Å diameter mesopore volume in the range of 0.05 to 0.70 cc/g; and (b) heating at least a portion of the initial catalytic zeolite at a temperature of at least 150° C. to thereby form a heat-modified catalytic zeolite, wherein the heating does not cause substantial migration of the catalytic nanoparticles out of the mesopores to the surface of the heat-modified catalytic zeolite.

BRIEF DESCRIPTION OF THE DRAWING FIGURES

Embodiments of the present invention are described herein with reference to the following drawing figures, wherein.

DETAILED DESCRIPTION

Figure 1:
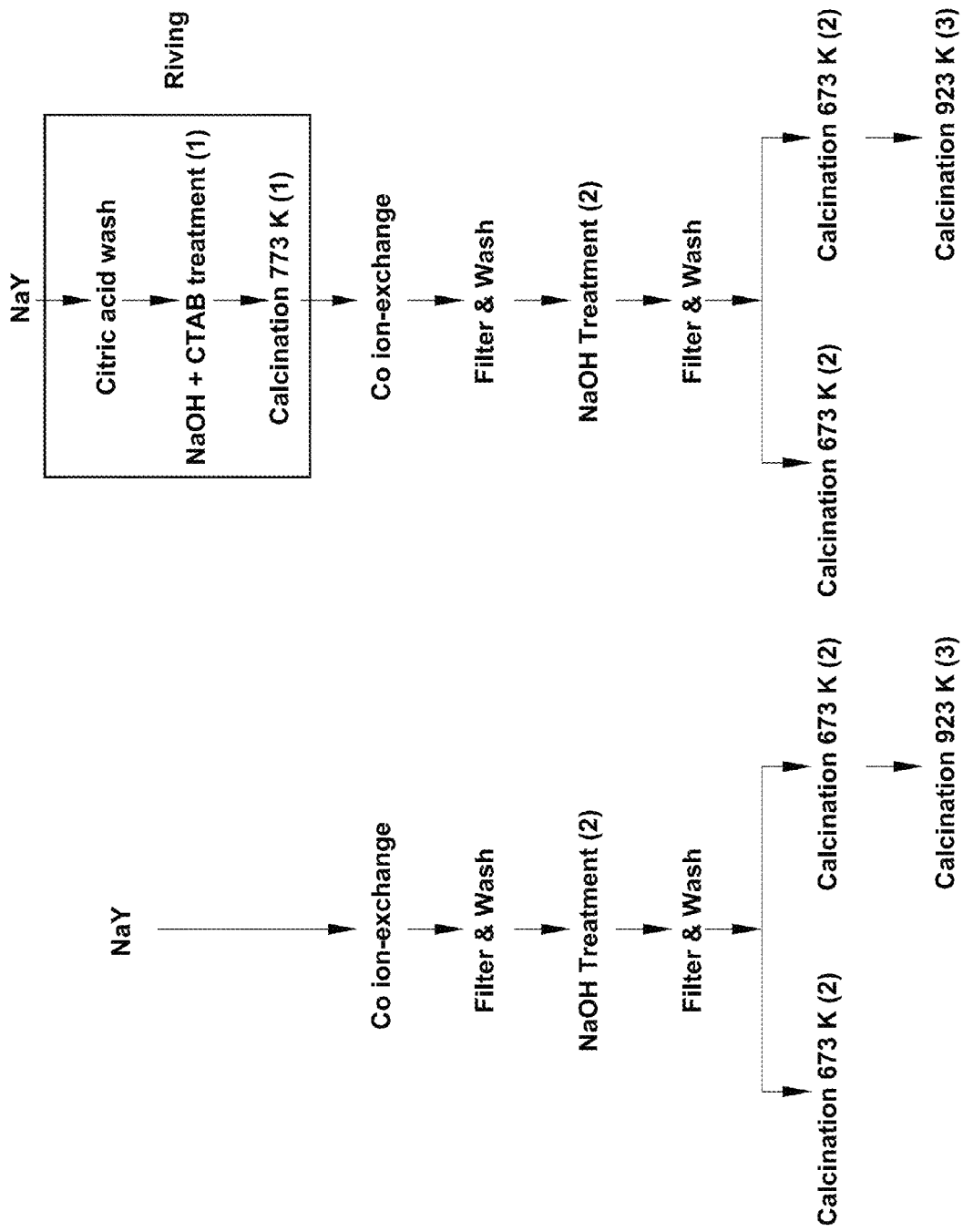
FIG. 1 is a flow diagram depicting the process steps of Example 1.

The present application is directed to the use of mesoporous zeolites in the production of catalyst compositions. In particular, various embodiments of the present application concern methods for preparing a catalyst composition from a mesoporous zeolite. In one or more embodiments, a catalyst composition is prepared by utilizing a mesoporous zeolite as a catalyst support and incorporating one or more types of catalytic nanoparticles within the mesoporous zeolite. As discussed in further detail below, the catalyst compositions of the present application exhibit superior stability, performance, and longevity when compared to previous catalyst compositions produced with conventional non-mesoporous zeolites.

Production of Mesoporous Zeolites

The following describes how the mesoporous zeolites used to produce the catalyst compositions of the current application can be synthesized.

An initial zeolite is employed as a starting material in preparing a mesoporous zeolite. In one or more embodiments, the initial zeolite can have an average unit cell size ("UCS") of at least 24.20, 24.25, 24.30, 24.35, 24.40, 24.45, 24.50, or 24.55 Å and/or not more than about 26.00, 25.50, 25.00, 24.95, 24.90, 24.85, 24.80, or 24.75 Å. In certain embodiments, the initial zeolite has not been previously subjected to any forms of pretreatment including, for example, steam treatment, thermal treatment, dealumination, and/or desilication. In other embodiments, the initial zeolite can be present as a component of a composite material. Such composite materials can further include, for example, one or more binder material components.

In various embodiments, the initial zeolite can have a low framework silicon-to-aluminum ratio ("Si/Al"). For example, the initial zeolite can have a framework Si/Al ratio of less than 30, less than 25, less than 20, less than 15, less than 10, or less than 5. Additionally, the initial zeolite can have a framework Si/Al ratio in the range of from about 1 to about 30, in the range of from about 2 to about 25, or in the range of from 5 to 20. Note that, as used herein, the "framework silicon-to-aluminum ratio" refers to the elemental ratio (i.e., silicon atoms to aluminum atoms) of the zeolite; this is in contrast to another commonly used parameter, the silica-to-alumina ratio (i.e., $SiO_2/Al_2O_3$) of the zeolite. Generally, the Si/Al of a zeolite can be determined via bulk chemical analysis. This method, however, does not distinguish between the tetrahedrally-coordinated framework aluminum atoms and non-framework aluminum ("NFA") atoms in the zeolite. As will be understood to those of ordinary skill in the art, the framework Si/Al can be determined by a combination of methods, such as using both bulk chemical analysis and aluminum-27 nuclear magnetic resonance ("$^{27}$Al NMR") and/or silicon-29 nuclear magnetic resonance ("$^{29}$Si NMR").

In various embodiments, the initial zeolite can have a 1-dimensional, 2-dimensional, or 3-dimensional pore structure. In one or more embodiments, the initial zeolite can exhibit long-range crystallinity. Materials with long-range crystallinity include all solids with one or more phases having repeating structures, referred to as unit cells, that repeat in a space for at least 10 nm. Furthermore, in various embodiments, the initial zeolite can be fully crystalline. Additionally, the initial zeolite can be a one-phase hybrid material.

The type of zeolite suitable for use as the initial zeolite is not particularly limited. However, in one or more embodiments, the initial zeolite can be selected from the group consisting of zeolite A, faujasite (i.e., zeolites X and Y; "FAU"), mordenite ("MOR"), CHA, ZSM-5 ("MFI"), ZSM-12, ZSM-22, beta zeolite, synthetic ferrierite ("ZSM-35"), synthetic mordenite, and mixtures of two or more thereof. In further embodiments, the initial zeolite can be a Y zeolite (i.e., faujasite) selected from the group consisting of USY, $NH_4Y$, NaY, a rare earth ion zeolite Y, and mixtures of two or more thereof. Specific examples of commercially-available Y zeolites suitable for use include, but are not limited to, USY CBV 500, USY CBV 720, USY CBV 760, NaY CBV 100, and $NH_4Y$ CBV 300, available from Zeolyst International.

Prior to being subjected to a mesopore formation process, the initial zeolite can be subjected to a framework modification process to facilitate subsequent mesopore formation. In various embodiments, the framework modification process can be any process that sufficiently compromises the integrity of the zeolite framework so that it becomes more responsive to mesopore creation. In general, compromising the framework reduces the crystallinity of the initial zeolite in order to produce a framework-modified zeolite having a lower apparent crystalline content. In one or more embodiments, the framework modification process can be sufficient to reduce the crystalline content of the initial zeolite by at least 1, at least 5, at least 10, at least 15, at least 20, at least 25, at least 30, at least 35, or at least 40 percent. As would be understood by one of ordinary skill in the art, the crystalline content of a zeolite can be measured by X-ray diffraction ("XRD") and is typically expressed in terms of weight percent of the tested material. Thus, in various embodiments, the difference in crystalline content between the initial zeolite and the framework-modified zeolite can be determined by XRD. Methods for determining the crystalline content of a zeolite are generally known to those of ordinary skill in the art. Accordingly, in one or more embodiments, the framework-modified zeolite can have a crystalline content that is less than the crystalline content of the initial zeolite, such as, for example, at least 1, at least 5, at least 10, at least 15, at least 20, at least 25, at least 30, at least 35, or at least 40 percent less than the crystalline content of the initial zeolite as measured by XRD. In further embodiments, the framework-modified zeolite can have a reduced crystalline content that is within 50 percent, within 45 percent, within 40 percent, within 35 percent, within 30 percent, within 25 percent, within 20 percent, within 15 percent, or within 10 percent of the initial zeolite. In certain other embodiments, the framework modification process can be selected so as to reduce the crystalline content of the initial zeolite by at least 90, at least 95, or at least 99 percent. In particular embodiments, the resulting framework-modified zeolite can have no or substantially no crystalline content as measured by X-ray diffraction (i.e., X-ray diffraction amorphous).

In additional or alternate embodiments, the framework modification process can increase the framework Si/Al of the initial zeolite. Thus, in various embodiments, the framework-modified zeolite can have a framework Si/Al that is at least 1, at least 2, at least 5, at least 10, at least 20, at least 30, at least 40, at least 50, at least 60, at least 70, at least 80, at least 90, or at least 100 percent greater than the framework Si/Al of the initial zeolite as measured by $^{27}$Al NMR. In further embodiments, the framework-modified zeolite can have a framework Si/Al that is in the range of from about 1 to about 100 percent greater than the framework Si/Al of the initial zeolite, in the range of from about 1 to about 90 percent greater than the framework Si/Al of the initial zeolite, in the range of from about 1 to about 80 percent greater than the framework Si/Al of the initial zeolite, in the range of from about 1 to about 70 percent greater than the framework Si/Al of the initial zeolite, in the range of from about 1 to about 60 percent greater than the framework Si/Al of the initial zeolite, in the range of from about 1 to about 50 percent greater than the framework Si/Al of the initial zeolite, in the range of from about 1 to about 40 percent greater than the framework Si/Al of the initial zeolite, in the range of from about 1 to about 30 percent greater than the framework Si/Al of the initial zeolite, in the range of from about 1 to about 20 percent greater than the framework Si/Al of the initial zeolite, in the range of from about 1 to about 10 percent greater than the framework Si/Al of the initial zeolite, in the range of from about 1 to about 5 percent greater than the framework Si/Al of the initial zeolite, or in the range of from about 1 to about 2 percent greater than the framework Si/Al of the initial zeolite, as measured by $^{27}$Al NMR. In still further embodiments, the framework-modified zeolite can have a framework Si/Al that is less than 100 percent greater than the framework Si/Al of the initial zeolite, less than 90 percent greater than the framework Si/Al of the initial zeolite, less than 80 percent greater than the framework Si/Al of the initial zeolite, less than 70 percent greater than the framework Si/Al of the initial zeolite, less than 60 percent greater than the framework Si/Al of the initial zeolite, less than 50 percent greater than the framework Si/Al of the initial zeolite, less than 40 percent greater than the framework Si/Al of the initial zeolite, less than 30 percent greater than the framework Si/Al of the initial zeolite, less than 20 percent greater than the framework Si/Al of the initial zeolite, less than 10 percent greater than the framework Si/Al of the initial zeolite, less than 5 percent greater than the framework Si/Al of the initial zeolite, or less than 2 percent greater than the framework Si/Al of the initial zeolite, as measured by $^{27}$Al NMR.

In various embodiments, the framework-modified zeolite can have a fewer number of Si—O—Al bonds in its zeolite framework than the initial zeolite. In various embodiments, the framework-modified zeolite can have at least 0.1, at least 1, at least 5, or at least 10 percent fewer Si—O—Al bonds than the initial zeolite. Furthermore, the framework-modified zeolite can have a greater number of Si—OH and/or Al—OH terminal groups than the initial zeolite. In various embodiments, the framework-modified zeolite can have at least 0.1, at least 1, at least 5, or at least 10 percent more Si—OH and/or Al—OH terminal groups than the initial zeolite. Furthermore, in one or more embodiments, the framework-modified zeolite can have a decreased aluminum content. However, in one or more embodiments, the aluminum content of the framework-modified zeolite can be maintained in an amount sufficient to preserve the unit cell size ("UCS") of the framework-modified zeolite at a minimum of at least 24.30, 24.35, 24.40, or 24.45 Å.

Although any framework modification process that achieves a framework-modified zeolite having one or more of the above-described characteristics may be employed, in various embodiments the framework modification process can be selected from the group consisting of: i) contacting at least a portion of the initial zeolite with an acid; ii) calcining at least a portion of the initial zeolite; and iii) contacting at least a portion of the initial zeolite with steam. These framework modification methods are described in greater detail in U.S. Patent Application Publication No. 2012/0258852, the entire disclosure of which is incorporated herein by reference. These aforementioned framework modification methods can be used individually or in any combination (including use of all three methods) to prepare the above-described framework-modified zeolite.

The initial zeolite and/or the framework-modified zeolite (e.g., acid-treated, calcined, and/or steam-treated zeolite) can be subjected to a mesopore formation process in order to form at least one mesopore in the initial zeolite and/or framework-modified zeolite. Methods for mesopore incorporation can generally include the following steps:

1. Contacting the initial zeolite and/or framework-modified zeolite with a pH controlling medium, optionally in the presence of a pore forming agent, under various time and temperature conditions.
2. Filtering, washing, and drying the zeolite.
3. Removing and/or recovering the pore forming agent (if present), for example, by calcination (removal) and/or chemical extraction (recovery).
4. The resulting material can also be chemically modified; blended with binders, matrix, and additives; and shaped (e.g., into beads, pellets, and FCC catalysts).

In one or more embodiments, the mesopore formation process can be performed employing any of the starting materials, reagents, methods, and conditions described in U.S. Pat. No. 7,589,041; U.S. Pat. No. 8,206,498; U.S. Patent Application Publication No. 2007/0244347; U.S. Patent Application Publication No. 2010/0190632; U.S. Patent Application Publication No. 2010/0196263; U.S. Patent Application Publication No. 2011/0171121; and U.S. Patent Application Publication No. 2011/0118107, the entire disclosures of which are incorporated herein by reference.

In one or more embodiments, the mesopore formation process at least comprises contacting the initial zeolite and/or framework-modified zeolite with a base. In various embodiments, the above-mentioned pH controlling medium can have a pH of at least 8, in the range of from about 8 to about 14, in the range of from about 8 to about 12, or in the range of from about 9 to about 11. Any base suitable for providing a pH in the desired range may be employed. In various embodiments, the base can be selected from the group consisting of ammonium hydroxide, tetraalkyl ammonium hydroxides, sodium hydroxide, potassium hydroxide, sodium carbonate, potassium carbonate, amines, and mixtures of two or more thereof. In certain embodiments, the base comprises a mixture of ammonium hydroxide and sodium hydroxide.

Though not wishing to be bound by theory, it is believed that contacting the initial zeolite or framework-modified zeolite with a base may cause at least partial desilication of the initial zeolite or framework-modified zeolite. Accordingly, in various embodiments, contacting the initial zeolite or framework-modified zeolite with a base may produce an at least partially desilicated zeolite. Additionally, though again not wishing to be bound by theory, it is believed that contacting the initial zeolite or framework-modified zeolite with a base can increase the crystalline content of the zeolite. Accordingly, in various embodiments, the resulting mesoporous zeolite (described more fully below) can have a crystalline content that is at least 1, at least 5, at least 10, at least 15, at least 20, at least 25, at least 30, at least 35, or at least 40 percent greater than the framework-modified zeolite. Furthermore, the resulting mesoporous zeolite can have a crystalline content that is at least 60, at least 65, at least 70, at least 75, at least 80, at least 85, at least 90, at least 95, or at least 99 percent of the crystalline content of the above-described initial zeolite, as measured by XRD. In further embodiments, the mesoporous zeolite can have a crystalline content of at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent, as measured by XRD.

As noted above, a pore forming agent may optionally be employed along with the pH controlling medium. In one or more embodiments, the pore forming agent can include a surfactant. When basic conditions are employed, typically a cationic surfactant can be used. In one or more embodiments, the surfactant employed can comprise one or more alkyltrimethylammonium salts and/or one or more dialkyldimethylammonium salts. In various embodiments, the surfactant can be selected from the group consisting of cetyltrimethyl ammonium bromide ("CTAB"), cetyltrimethyl ammonium chloride ("CTAC"), and mixtures thereof. Other suitable pore forming agents include, but are not limited to, non-ionic surfactants, polymers (e.g., block copolymers), and soft templates.

In alternate embodiments, the mesopore introduction process can be performed in the absence or substantial absence of a pore forming agent. Thus, in various embodiments, the mesopore introduction process can be performed in the absence or substantial absence of a surfactant. Similarly, the mesopore introduction process can be performed in the absence or substantial absence of any cationic surfactants, non-ionic surfactants, polymers (e.g., block copolymers), and soft templates.

In various embodiments, following contact with the pH controlled medium, the zeolite can be subjected to thermal treatment. In various embodiments, such thermal treatment can include contacting at least a portion of the zeolite with steam. In one or more embodiments, the zeolite can be contacted with steam having a temperature of at least 450° C., at least 550° C., at least 650° C., or at least 700° C. Additionally, following contact with the pH controlled medium, the zeolite can be contacted with steam having a temperature in the range of from about 450 to about 1,000° C., in the range of from about 500 to about 950° C., in the range of from about 650 to about 950° C., in the range of from about 700 to about 850° C., or about 788° C. Thermal treatment can be performed for a time period ranging from about 1 minute to about 24 hours, about 5 minutes to about 12 hours, or about 10 minutes to about 8 hours.

Following the pH controlled medium contacting step, the zeolite can be filtered, washed, and/or dried. In one or more embodiments, the zeolite can be filtered via vacuum filtration and washed with water. Thereafter, the recovered zeolite can optionally be filtered again and optionally dried.

Following the filter, wash, and drying steps, the zeolite can be subjected to additional heat treatment or chemical extraction in order to remove or recover at least a portion of the pore forming agent, if employed. In one or more embodiments, the zeolite can be calcined in nitrogen at a temperature in the range of from about 500 to about 600° C., and then in air for pore forming agent (e.g., surfactant) removal. The pore forming agent removal technique is selected based, for example, on the time needed to remove all of the pore forming agent from the zeolite. The total time period employed for heat treatment of the zeolite can be in the range of from about 30 minutes to about 24 hours, or in the range of from 1 to 12 hours.

In various embodiments, the resulting mesoporous zeolite can be subjected to one or more post-formation treatments. Suitable post-formation treatments are described, for example, in U.S. Patent Application Publication No. 2007/0244347, which, as noted above, is incorporated herein by reference in its entirety. In various embodiments, the mesoporous zeolite can be subjected to one or more post-formation treatments selected from the group consisting of calcination, ion exchange, steaming, and combinations of two or more thereof. Suitable ion exchange procedures for the resulting mesoporous zeolite include, but are not limited to, ammonium ion exchange, rare earth ion exchange, lithium ion exchange, potassium ion exchange, calcium ion exchange, and combinations of two or more thereof.

The resulting mesoporous zeolite can be a one-phase hybrid single crystal having long range crystallinity. In one or more embodiments, the mesoporous zeolite can be fully crystalline, and can include mesopore surfaces defining a plurality of mesopores. A cross-sectional area of each of the plurality of mesopores can be substantially the same. Additionally, in one or more embodiments the mesoporous zeolite can be a mesostructured zeolite. In various embodiments, the mesoporous zeolite can have a total 20 to 80 Å diameter mesopore volume of at least 0.05, 0.06, 0.07, 0.08, 0.09, 0.10, 0.11, 0.12, 0.13, 0.14, 0.15, 0.20, or 0.25 cc/g. Additionally, the mesoporous zeolite can have a total 20 to 80 Å diameter mesopore volume in the range of from about 0.05 to about 0.70, in the range of from about 0.10 to about 0.60 cc/g, in the range of from about 0.15 to about 0.50 cc/g, or in the range of from 0.20 to 0.40 cc/g.

In various embodiments, the resulting mesoporous zeolite can have a total 20 to 80 Å diameter mesopore volume that is at least 5, at least 10, at least 20, at least 30, at least 40, at least 50, at least 60, at least 70, at least 80, at least 90, at least 100, at least 200, at least 300, at least 400, or at least 500 percent greater than the 20 to 80 Å diameter mesopore volume of the above-described initial zeolite. Furthermore, the mesoporous zeolite can have a total 20 to 80 Å diameter mesopore volume that is at least 0.02, at least 0.04, at least 0.05, at least 0.06, at least 0.07, at least 0.08, at least 0.09, at least 0.1, at least 0.2, at least 0.3, at least 0.4, at least 0.5, or at least 1.0 cc/g greater than the total 20 to 80 Å diameter mesopore volume of the initial zeolite.

In various embodiments, the mesoporous zeolite can have a framework Si/Al of less than 50, less than 45, less than 40, less than 35, less than 30, less than 25, less than 20, less than 15, less than 10, or less than 5. Additionally, the mesoporous zeolite can have a framework Si/Al in the range of from 1 to 30, in the range of from 2 to 25, or in the range of from 5 to 20.

As noted above, in various embodiments the severity of the framework modification process can be selected so as to eliminate essentially all (e.g., 95 volume percent) of the crystallinity from the initial zeolite. Accordingly, in various embodiments, the mesoporous zeolite can have a crystalline content of less than 10, less than 5, less than 4, less than 3, less than 2, or less than 1 weight percent as measured by XRD. Furthermore, in various embodiments, the mesoporous zeolite can be a mesoporous material having no or substantially no crystalline content as measured by XRD.

Production of the Catalyst Compositions

The catalyst compositions of the present application can be produced from the mesoporous zeolites described above or from any other mesoporous zeolites not described herein as long as they contain sufficient mesoporosity. In one or more embodiments, the catalyst composition described herein comprises at least one mesoporous zeolite having catalytic nanoparticles embedded, incorporated, and/or dispersed therein. In such embodiments, the mesoporous zeolite functions as a catalyst support for the catalytic nanoparticles.

The catalytic nanoparticles can comprise any nanoparticle that exhibits catalytic activity. In various embodiments, the catalytic nanoparticles can comprise a catalyst metal. In such embodiments, the catalyst metal can comprise any metal compound exhibiting catalytic properties. For example, the catalyst metal can exhibit catalytic cracking properties when utilized in a hydrocracking process. In one or more embodiments, the catalyst metal comprises a transition metal. In such embodiments, the transition metal can be selected from the group consisting of Ni, Co, W, Mo, Pd, Pt, Ru, Rh, Os, Ir, Nb, and combinations thereof. Additionally or alternatively, the catalyst metal can comprise a rare earth metal. In such embodiments, the rare earth metal can be selected from the group consisting of La, Ce, and combinations thereof. In other embodiments, the catalyst metal comprises one or more metals selected from IUPAC Groups IVA, VIA, VIIA, and VIIIA. In another embodiment, the catalyst metal is selected from the group consisting of cerium oxide, cobalt oxide, nickel oxide, and combinations thereof. In yet another embodiment, the catalyst metal comprises oxides, sulfides, and/or hydroxides of the catalyst metal.

The catalyst composition can be produced by incorporating and/or dispersing one or more types of catalytic nanoparticles within the mesoporous zeolite to thereby form a catalytic zeolite. As used herein, the term "catalytic zeolite" refers to a mesoporous zeolite having one or more types of catalytic nanoparticles embedded, incorporated, and/or dispersed therein. The catalytic nanoparticles can be incorporated into the mesoporous zeolite via physical, chemical, and/or physiochemical methods. Such incorporation methods can include, for example, sonication, microwave irradiation, pulsed laser ablation ("PLA"), supercritical fluid impregnation, gamma radiation, plasma reduction, ion exchange, calcination, pH treatment, impregnation, chemical vapor deposition ("CVD"), photochemical, microemulsions, flame spray pyrolysis, and combinations thereof. Many of these incorporation methods are described in further detail in the article entitled, "Supported metal nanoparticles on porous materials" by White et al., the entire disclosure of which is incorporated herein by reference.

In certain embodiments, the catalytic zeolite is produced by subjecting the mesoporous zeolite to ion exchange with one or more catalyst metals followed by a pH treatment and/or calcination. In one embodiment, the catalytic nanoparticles are incorporated into the mesoporous zeolite by ion exchange followed by a pH treatment. In another embodiment, the catalytic nanoparticles are incorporated into the mesoporous zeolite by ion exchange followed by calcination. In yet another embodiment, the catalytic nanoparticles are incorporated into the mesoporous zeolite by ion exchange, followed by a pH treatment, and then followed by calcination.

In one or more embodiments, the catalytic nanoparticles are incorporated into the mesoporous zeolite by subjecting the mesoporous zeolite to ion exchange with one or more catalyst metals so as to form an ion-exchanged catalytic zeolite. In such embodiments, the catalyst metal can be in the form of ions such as, for example, cations. During ion exchange, at least a portion of the catalyst metal can be incorporated into the mesopores of the mesoporous zeolite. In certain embodiments, the ion exchange can occur at a temperature that is at least room temperature. In other embodiments, the ion exchange occurs at temperatures of at least 20, 25, 30, 35, 40, 45, or 50° C. and/or not more than 150, 140, 130, 120, 110, 100, 90, 80, or 70° C. Additionally or alternatively, the ion exchange can occur over a time period of at least 0.1, 0.5, 1, 2, 3, 4, 5, 6, 7, 8, 9, 10, 11, or 12 hours and/or not more than 48, 36, 30, 24, or 18 hours. Subsequent to ion exchange, the ion-exchanged catalytic zeolite can be filtered, washed, and/or dried prior to subsequent processing.

In one or more embodiments, the catalytic nanoparticles are incorporated into the mesoporous zeolite by subjecting the ion-exchanged catalytic zeolite and/or a mixture of mesoporous zeolite and catalytic nanoparticles to a pH treatment with one or more pH additives. In such embodiments, at least a portion of the ion-exchanged catalytic zeolite and/or the mixture of mesoporous zeolite and catalytic nanoparticles are contacted with one or more pH additives to form a pH-treated catalytic zeolite. In embodiments where an ion-exchanged catalytic zeolite is subjected to the pH treatment, at least a portion of the catalyst metal ions are precipitated within the mesopores of the mesoporous zeolite. In certain embodiments, the pH additives comprise one or more bases. In such embodiments, the pH additives can be selected from the group consisting of ammonium hydroxide, tetraalkyl ammonium hydroxides, sodium hydroxide, potassium hydroxide, sodium carbonate, potassium carbonate, amines, and combinations thereof. In alternative embodiments, the pH additives comprise one or more acids. In another embodiment, the pH additives have a pH of at least 4, 5, 6, 7, 8, 9, 10, or 11. In yet another embodiment, the pH treatment occurs at a temperature of at least 20° C. and over a time period of at least 5, 10, 20, or 30 minutes and/or not more than 24, 12, 6, or 3 hours. Subsequent to the pH treatment, the pH-treated catalytic zeolite can be filtered, washed, and/or dried prior to subsequent processing.

In one more embodiments, the ion-exchanged catalytic zeolite, the pH-treated catalytic zeolite, and/or a mixture of mesoporous zeolite and catalytic nanoparticles are subjected to calcination in order to form a calcined catalytic zeolite. In such embodiments, at least a portion of the ion-exchanged catalytic zeolite, pH-treated catalytic zeolite, and/or mixture of mesoporous zeolite and catalytic nanoparticles can be subjected to calcination at a temperature of at least 300, 325, 350, 375, 400, 425, 450, 500, 550, or 600° C. and/or not more than 1,000, 950, 900, 800, 750, 700, or 650° C. In various embodiments, the calcination occurs for a time period of at least 0.1, 0.5, 1, 2, 3, 4, 5, 6, 7, 8, 9, 10, 11, or 12 hours and/or not more than 48, 36, 24, or 12 hours. In one or more embodiments, the calcination can increase the average particle size of the catalytic nanoparticles dispersed within the catalytic zeolite.

In certain embodiments, the newly-formed catalytic zeolite can be subjected to one or more post-formation treatments or utilized in various conversion processes as described in further detail below. These post-formation treatments can include, for example, calcination, ion exchange, and steaming. In one or more embodiments, at least a portion of the newly-formed catalytic zeolite can be heated at a temperature of at least 150, 175, 200, 250, 300, 325, 350, 375, 400, 425, 450, 500, 550, or 600° C. and/or not more than 1,500, 1,250, 1,000, 900, 850, 750, or 700° C. for a time period of at least 0.1, 0.5, 1, 2, 3, 4, 5, 6, 7, 8, 9, 10, 11, or 12 hours and/or not more than 48, 36, 24, or 12 hours to thereby form a heat-modified catalytic zeolite. In such embodiments, this heating step can comprise conditions suitable for post-formation treatments (e.g., calcination, ion exchange, and steaming) or conversion processes (e.g., hydrocracking or hydrotreating). In other embodiments, the newly-formed catalytic zeolite described above can be further treated with one or more reductants such as, for example, hydrogen gas and/or sulfides, in order to at least partially reduce any catalyst metal incorporated within the mesopores of the catalytic zeolite into their corresponding elemental metal.

Subsequent to the production methods described above, the newly-formed catalytic zeolite can have a significant amount of the catalytic nanoparticles dispersed throughout its mesopores. For example, at least 20, 30, 40, 50, 60, 70, 80, 90, or 95 and/or not more than about 99.99, 99.9, or 99.5 or 99 weight percent of the total amount of the catalytic nanoparticles associated with the catalytic zeolite can be located within the mesopores of the catalytic zeolite. In such embodiments, there can be little or no agglomerations of the catalytic nanoparticles on the surface of the catalytic zeolite. In other embodiments, at least 20, 30, 40, 50, 60, 70, 80, 90, or 95 and/or not more than about 99.99, 99.9, or 99.5 or 99 weight percent of the total amount of the catalytic nanoparticles associated with the heat-modified catalytic zeolite described above can be located within the mesopores of the heat-modified catalytic zeolite.

In one or more embodiments, at least 10, 15, 20, 25, 30, 35, 40, 45, 50, 55, 60, 65, 70, 75, 80, 85, 90, 95, or 99 weight percent of the catalytic nanoparticles that are dispersed within the mesopores of the catalytic zeolite have an average particle size of at least 2, 3, 4, 5, 6, 7, 8, 9, 10, 11, 12, 13, 14, 15 and/or not more than 100, 90, 80, 70, 60, 50, 40, 30, 29, 28, 27, 26, or 26 nm as measured using high magnification transmission electron microscopy ("TEM"). In yet another embodiment, at least 10, 15, 20, 25, 30, 35, 40, 45, 50, 55, 60, 65, 70, 75, 80, 85, 90, 95, or 99 weight percent of the catalytic nanoparticles that are dispersed within the mesopores of the heat-modified catalytic zeolite have an average particle size of at least 2, 3, 4, 5, 6, 7, 8, 9, 10, 11, 12, 13, 14, 15 and/or not more than 100, 90, 80, 70, 60, 50, 40, 30, 29, 28, 27, 26, or 26 nm as measured using high magnification TEM.

In various embodiments, the catalyst composition can consist of, consist essentially of, or comprise the catalytic zeolite.

In various embodiments, the catalyst composition is formed by combining the catalytic zeolite with at least one binder. The binder can be added at any point during the production of the catalyst composition and/or catalytic zeolite. For example, the binder can be added prior to and/or subsequent to incorporating the catalytic nanoparticles into the mesoporous zeolite. In one embodiment, the binder is in the form of a gel or gelatinous precipitate. In certain embodiments, the binder can be selected from the group consisting of alumina, alumina-silica, silica, titania, zirconia, clays, boron oxide, and combinations thereof. In one or more embodiments, the catalyst composition can comprise at least 0.1, 1, 5, 10, 20, 30, 40, or 50 weight percent and/or not more than 99.9, 90, 80, 70, 60, 50, 40, 30, 20, or 10 weight percent of the catalytic zeolite. In other embodiments, the catalytic composition comprises at least 0.1, 1, 5, 10, 20, 30, 40, or 50 weight percent and/or not more than 99.9, 90, 80, 70, 60, 50, 40, 30, 20, or 10 weight percent of at least one binder.

Applications of the Catalyst Composition

The catalyst compositions of the present application exhibit superior catalytic properties when compared to conventional catalyst compositions. This improvement is largely attributed to the mesoporosity of the catalytic zeolite and the productions methods described herein. The mesoporous zeolite used to form the catalyst composition functions as a superior catalyst support when compared to a catalyst support produced from a conventional zeolite. A common limitation of zeolites as catalyst supports is their inability to accommodate catalyst nanoparticles larger than their micropores, which, in turn, causes undesirable migration of the nanoparticles to the zeolite surface. Subsequently, these migrated nanoparticles form agglomerations on the zeolite surface, thereby significantly reducing the catalytic performance of the catalyst composition. As is known, such migration and agglomerations of the catalytic particles on the surface of the zeolites greatly decrease the functionality and longevity of the catalyst composition. In contrast, due to the mesoporosity of the catalytic zeolites described herein, the catalytic zeolites as described above can facilitate larger particle sizes and agglomerations of the catalyst particles within its pores. Consequently, this mesoporosity suppresses the migration of the catalytic nanoparticles from within the catalytic zeolite and ultimately deters the formation of catalytic nanoparticle agglomerations on the zeolite surface when the catalyst composition is exposed to severe operating conditions.

Due to its mesoporosity and the production methods described above, the catalytic zeolite in the catalyst composition is capable of retaining more of the catalytic nanoparticles dispersed within its pores when exposed to severe operating conditions during use. In one or more embodiments, at least 20, 25, 30, 35, 40, 45, 50, 55, 60, 65, 70, 75, 80, 85, 90, 95, or 99 weight percent of the catalytic nanoparticles originally located within the mesopores of the catalytic zeolite can be maintained within the mesopores of the catalytic zeolite subsequent to using the catalytic zeolite in a chemical processing operation. In various embodiments, not more than about 99, 95, 90, 80, 70, 60, 50, 40, 30, or 20 weight percent of the catalytic nanoparticles originally located within the mesopores of the catalytic zeolite migrate to and agglomerate on the surface of the catalytic zeolite subsequent to using the catalytic zeolite in a chemical processing operation.

The catalyst compositions described herein can be employed in a wide array of applications. In various embodiments, the catalyst composition described herein can be employed in chemical processing operations including, for example, catalytic cracking, fluidized catalytic cracking, hydrogenation, hydrosulfurization, hydrocracking, hydroisomerization, oligomerization, alkylation, or combinations thereof.

In one embodiment, the catalyst compositions can be used in hydrocracking. In such hydrocracking embodiments, a hydrocarbon-containing feedstock is contacted with at least one catalyst composition described herein in the presence of hydrogen under hydrocracking conditions to produce a hydrocracked product.

Hydrocracking of hydrocarbon-containing feedstocks is an important refining process, which makes it possible to upgrade heavier hydrocarbon-containing feeds into more desirable lighter fractions (e.g., gasoline, jet fuels, and light diesel fuels). Relative to catalytic cracking, catalytic hydrocracking can produce middle distillates of high quality and gasolines with lower octane numbers. In various embodiments, the hydrocracking decreases the aromatic content of the hydrocarbon-containing feedstock.

The catalyst composition of the present application can be distinctly manufactured as described above so as to produce a catalyst composition exhibiting superior catalytic properties for use in hydrocracking. For instance, the catalyst composition can comprise a bifunctional catalyst having acidic and hydrogenation functionality. Such bifunctional catalysts are prevalent in hydrocracking. In this case, the catalyst metal catalyzes the dissociative adsorption of hydrogen and the mesoporous zeolite provides the acidity. The controlled pore size and controlled mesopore surface in the catalytic zeolites can make the bifunctional activity more efficiently present as compared to a bifunctional conventional catalyst. In addition to the zeolitic acidity present in the mesoporous zeolites, the controlled pore size enables larger pores that allow for a higher dispersion of the metal phase and the processing of larger hydrocarbons.

Particular catalytic metals that can be incorporated into the catalytic zeolites specifically for hydrocracking include transition metals such as, for example, Ni, Co, W, Mo, Pd, Pt, Ru, Rh, Os, Ir, Nb, and combinations thereof. These metals can be supported in the mesoporous zeolites by the previously described methods.

In one or more embodiments, the catalytic zeolite in the catalyst composition is capable of retaining more of the catalytic nanoparticles dispersed within its pores compared to conventional zeolites when exposed to hydrocracking conditions. For example, at least 20, 25, 30, 35, 40, 45, 50, 55, 60, 65, 70, 75, 80, 85, 90, 95, or 99 weight percent of the catalytic nanoparticles originally located within the mesopores of the catalytic zeolite can be maintained within the mesopores of the catalytic zeolite subsequent to hydrocracking. In various embodiments, not more than 99, 95, 90, 80, 70, 60, 50, 40, 30, or 20 weight percent of the catalytic nanoparticles originally located within the mesopores of catalytic zeolite migrate to and agglomerate on the surface of the catalytic zeolite during hydrocracking.

Typically, hydrocracking involves passing the feedstock, such as a heavy fraction, through one or more hydrocracking catalyst beds under conditions of elevated temperature and/or pressure. The plurality of catalyst beds may function to remove impurities such as any metals and other solids. The catalyst beads also crack or convert the longer chain molecules in the feedstock into smaller ones. Hydrocracking can be affected by contacting the particular fraction or combination of fractions with hydrogen in the presence of a suitable catalyst at conditions, including temperatures in the range of from about 200 to 480° C. and at pressures from about 2 to about 25 MPa, using space velocities based on the hydrocarbon feedstock of about 0.1 to 20 $hr^{-1}$.

The hydrocarbon-containing feedstock can comprise any feedstock containing hydrocarbons and that is capable of being subjected to hydrocracking. For example, the hydrocarbon-containing feedstock can be a light gas oil, medium gas oil, heavy gas oil, LCO, atmospheric distillate, visbreaker gas oil, deasphalted oil, coker gas oil, FCC heavy cycle oil, vacuum gas oil, and mixtures thereof. In one embodiment, at least 50, 75, 90, or 99 weight percent of the hydrocarbon-containing feedstock has a boiling point of at least 275, 300, or 325° C. and/or not more than 700, 650, or 600° C. In another embodiment, the hydrocarbon-containing feedstock has an aromatic content of at least 10, 15, 20, 30, 40, 50, or 60 weight percent.

In various embodiments, at least a portion of the hydrocracked product comprises diesel fuel, jet fuel, naphtha, low sulfur fuel oil, kerosene, liquefied petroleum gas, and mixtures thereof. In one embodiment, at least 50, 75, 90, or 99 weight percent of the hydrocracked product has a boiling point of at least 100, 125, or 150° C. and/or not more than 500, 450, 400, or 350° C. In another embodiment, the hydrocracked product comprises an aromatic content of at least 1, 5, 10, 15, 20, or 30 and/or not more than 60, 50, 40, 30, or 20 weight percent. In yet another embodiment, the hydrocracked product comprises an aromatic content that is at least 10, 20, 30, 40, 50, 60, 70, 80, 90, or 99 percent less than the aromatic content of the hydrocarbon-containing feedstock.

Various other applications for the catalyst compositions are disclosed in U.S. Pat. No. 7,589,041, which, as noted above, is incorporated herein by reference in its entirety.

EXAMPLES

The following examples are intended to be illustrative of the present invention in order to teach one of ordinary skill in the art to make and use the invention and are not intended to limit the scope of the invention in any way.

Example 1

In this example, cobalt oxide nanoparticles were synthesized inside the cages of a zeolite by a method including three steps: (i) ion-exchange of cobalt ions into the zeolite, (ii) precipitation of cobalt ions with sodium hydroxide within the supercages of the zeolite, and (iii) calcination. Two types of zeolite, a commercial NaY zeolite and a mesoporous NaY zeolite, were analyzed in this example. In addition, two calcination temperatures (673 K and 923 K) were tested to study the effect of mesoporosity on the migration and agglomeration of the catalyst nanoparticles, which negatively affects catalytic performance.

The zeolites used in this study were a commercial NaY zeolite and a modified version thereof that had been subjected to a mesopore formation process ("riving") involving subjecting the zeolite to an acid wash with citric acid and then treatment with NaOH and CTAB at 80° C.

Zeolite-encapsulated cobalt oxide nanoparticles were then synthesized by the following procedure. In the first step, Co(II) cations were introduced into the zeolite by ion-exchange at 353 K (80° C.) in an aqueous solution of cobalt nitrate (100 ml, 5% cobalt) for 24 hours. The exchanged zeolite was filtered, thoroughly washed with deionized water, and then dried. In the following step, the exchanged zeolite was treated with NaOH solutions (0.1 M) at room temperature. When the color of the sample changed from light blue to dark blue during the NaOH treatment this indicated that the precipitation of cobalt hydroxide had occurred within the zeolite. After treating for 1 hour, the sample was recovered by filtration, washed thoroughly with deionized water, dried, and subjected to calcination in air. The calcination was performed at a temperature of 673 K (400° C.) for 6 hours. In some samples, the calcination temperature was increased to 923 K (650° C.) in order to investigate the effect of the calcination temperature on nanoparticle migration to the zeolite surface and its subsequent growth. The overall process flow diagram of this example is depicted in FIG. 1, with the comparative process being depicted on the left and the inventive process being depicted on the right.

Figure 2:
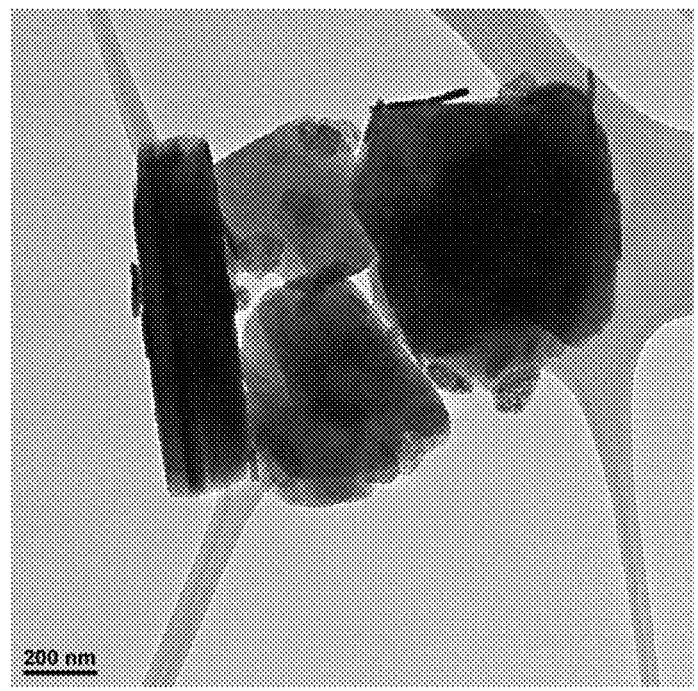
FIG. 2 is a low magnification transmission electron microscopy ("TEM") micrograph of a conventional non-mesoporous NaY zeolite as prepared in Example 1 after being calcined at 673 K.
Figure 3:
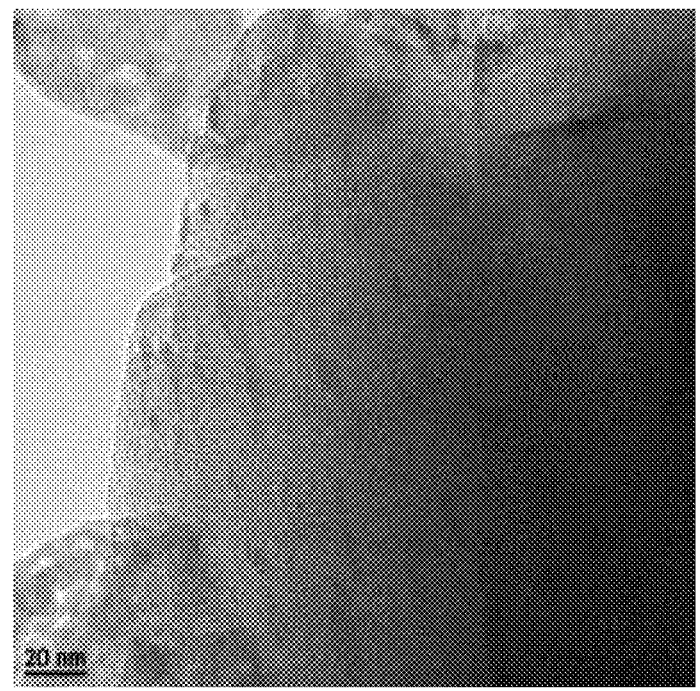
FIG. 3 is a high magnification TEM micrograph of the conventional non-mesoporous NaY zeolite as prepared in Example 1 after being calcined at 673 K.
Figure 4:
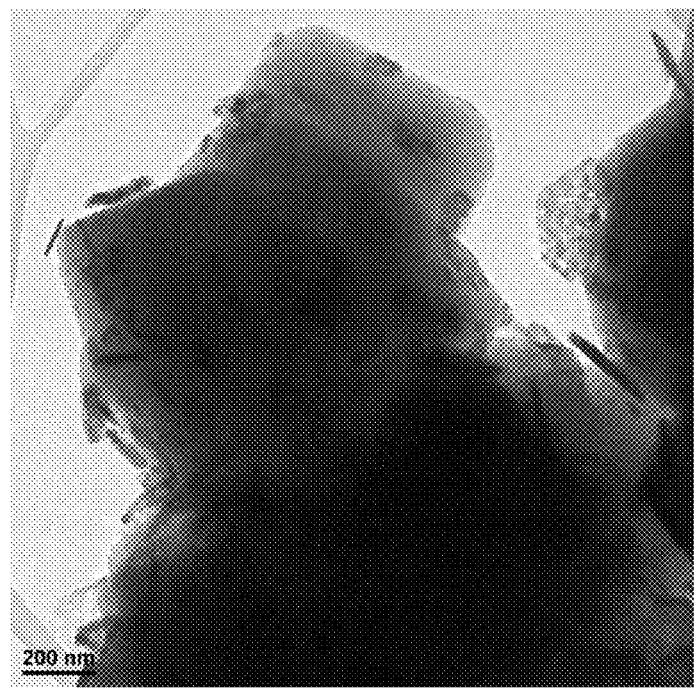
FIG. 4 is a low magnification TEM micrograph of the conventional non-mesoporous NaY zeolite as prepared in Example 1 after being calcined at 923 K.
Figure 5:
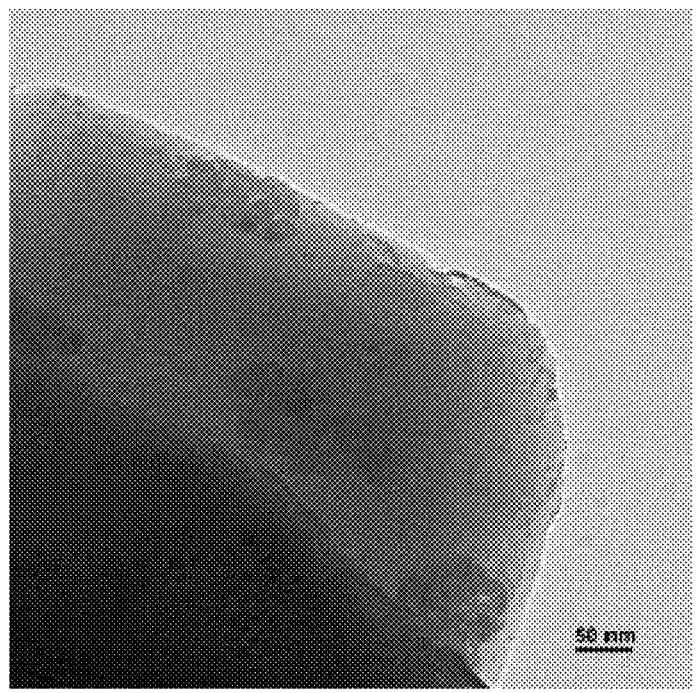
FIG. 5 is a high magnification TEM micrograph of the conventional non-mesoporous NaY zeolite as prepared in Example 1 after being calcined at 923 K.

FIGS. 2 and 3 depict the comparative cobalt oxide/non-mesoporous NaY materials calcined at 673 K, while FIGS. 4 and 5 depict the comparative cobalt oxide/non-mesoporous materials calcined at 923 K. As can be seen in FIGS. 2 and 3, the nanoparticles can be observed on the external surface of the zeolite crystals even after the mild calcination treatment. As shown in FIGS. 4 and 5, this phenomenon is even more obvious after the higher temperature calcination, which simulates the more severe operating conditions of hydrocracking.

Figure 6:
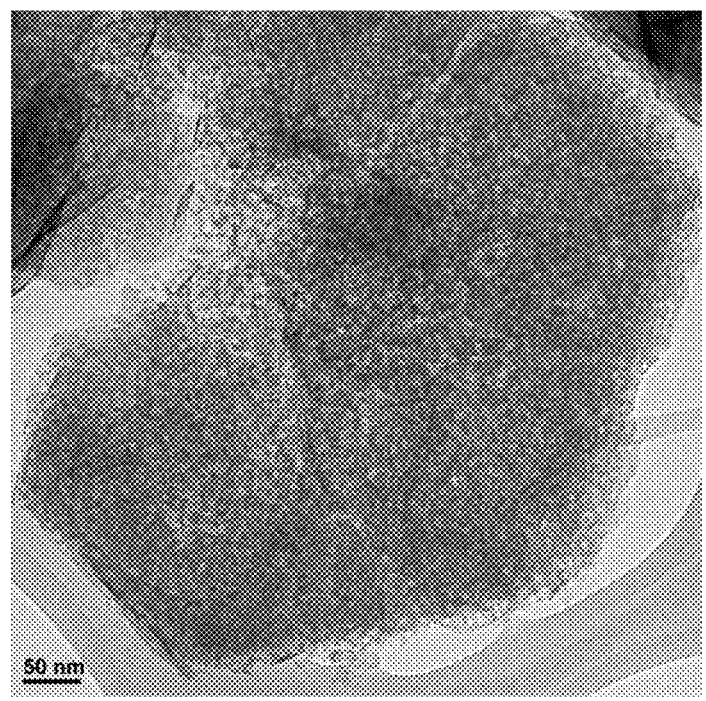
FIG. 6 is a low magnification TEM micrograph of an inventive mesoporous NaY zeolite as prepared in Example 1 after being calcined at 673 K.
Figure 7:
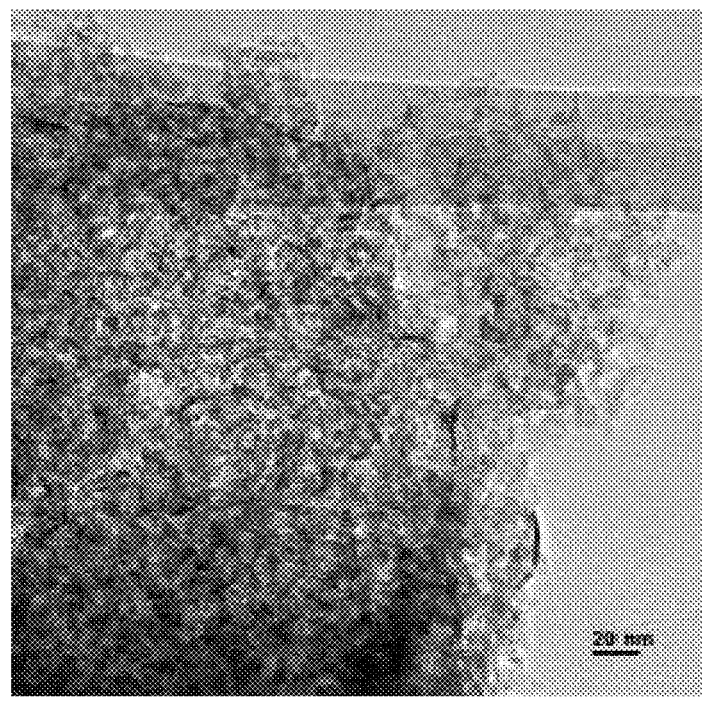
FIG. 7 is a high magnification TEM micrograph of the inventive mesoporous NaY zeolite as prepared in Example 1 after being calcined at 673 K.
Figure 8:
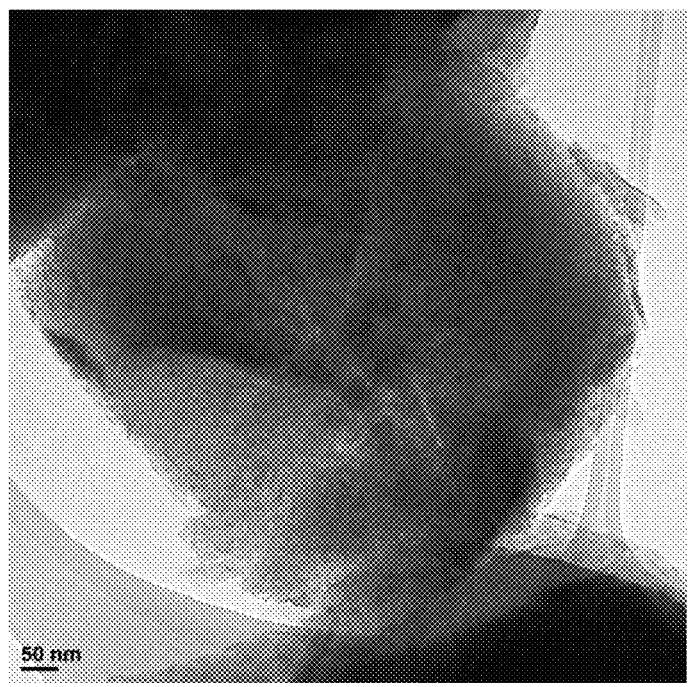
FIG. 8 is a low magnification TEM micrograph of the inventive mesoporous NaY zeolite as prepared in Example 1 after being calcined at 923 K.
Figure 9:
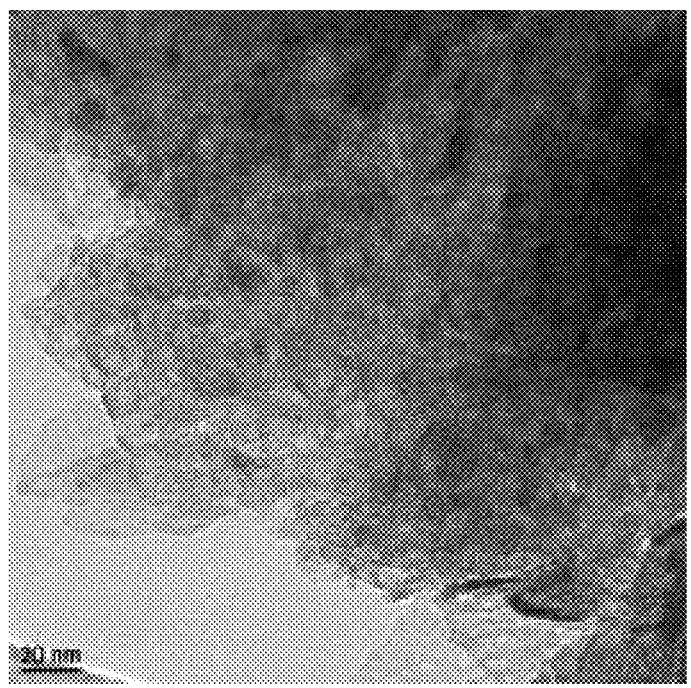
FIG. 9 is a high magnification TEM micrograph of the inventive mesoporous NaY zeolite as prepared in Example 1 after being calcined at 923 K.

FIGS. 6 and 7 depict the inventive cobalt oxide/mesoporous NaY materials calcined at 673 K, while FIGS. 8 and 9 depict the inventive cobalt oxide/mesoporous NaY materials calcined at 923 K. Unlike the comparative non-mesoporous NaY depicted in FIGS. 2 and 3, the cobalt oxide nanoparticles can hardly be seen on the external surface of the mesoporous NaY after calcination at 673 K as shown in FIG. 6. The darker spots throughout the mesoporous zeolite shown in FIG. 6 depict the multitude of mesopores saturated with the cobalt nanoparticles. Since the nanoparticles were so well dispersed within the mesopores as shown in FIG. 6, a higher magnification was used to confirm their presence in the mesopores of the zeolite as depicted in FIG. 7. FIG. 7 confirms that the cobalt oxide nanoparticles were dispersed throughout the mesopores of the zeolite and that the presence of mesoporosity accommodated the internal migration of these nanoparticles within the mesopores of the zeolite, thereby significantly suppressing their agglomeration and growth on the surface of the zeolite. Even at more severe calcination conditions as shown in FIGS. 8 and 9, the nanoparticles were still highly dispersed throughout the mesopores of the zeolite. While FIGS. 8 and 9 show that there were some nanoparticle agglomerations on the external surface of the zeolite, these agglomerations were significantly smaller than those formed on the conventional zeolites shown in FIGS. 4 and 5.

A common limitation of zeolites as catalysts supports is their ability to accommodate nanoparticles larger than their micropores, which causes undesirable migration of the nanoparticles to the zeolite surface, thereby significantly reducing their catalytic performance. The presence of mesoporosity in zeolites, as shown above, dramatically reduced this limitation of conventional zeolites by allowing the catalyst nanoparticles to aggregate in the mesopores, which provide the surface area and the space necessary to disperse and maintain the catalytic nanoparticles within the zeolite.

Example 2

In this example, cerium oxide nanoparticles were synthesized inside the cages of a zeolite by a method including three steps: (i) ion-exchange of cerium ions into the zeolite, (ii) precipitation of cerium ions with sodium hydroxide within the supercages of the zeolite, and (iii) calcination. Two types of zeolite, a commercial NaY zeolite and a mesoporous NaY zeolite, were analyzed in this example. In addition, two calcination temperatures (673 K and 923 K) were tested to study the effect of mesoporosity on the migration and agglomeration of the catalyst nanoparticles, which negatively affects catalytic performance.

The zeolites used in this study were a commercial NaY zeolite and a modified version thereof that had been subjected to a mesopore formation process ("riving") involving subjecting the zeolite to an acid wash with citric acid and then treatment with NaOH and CTAB at 80° C.

Figure 10:
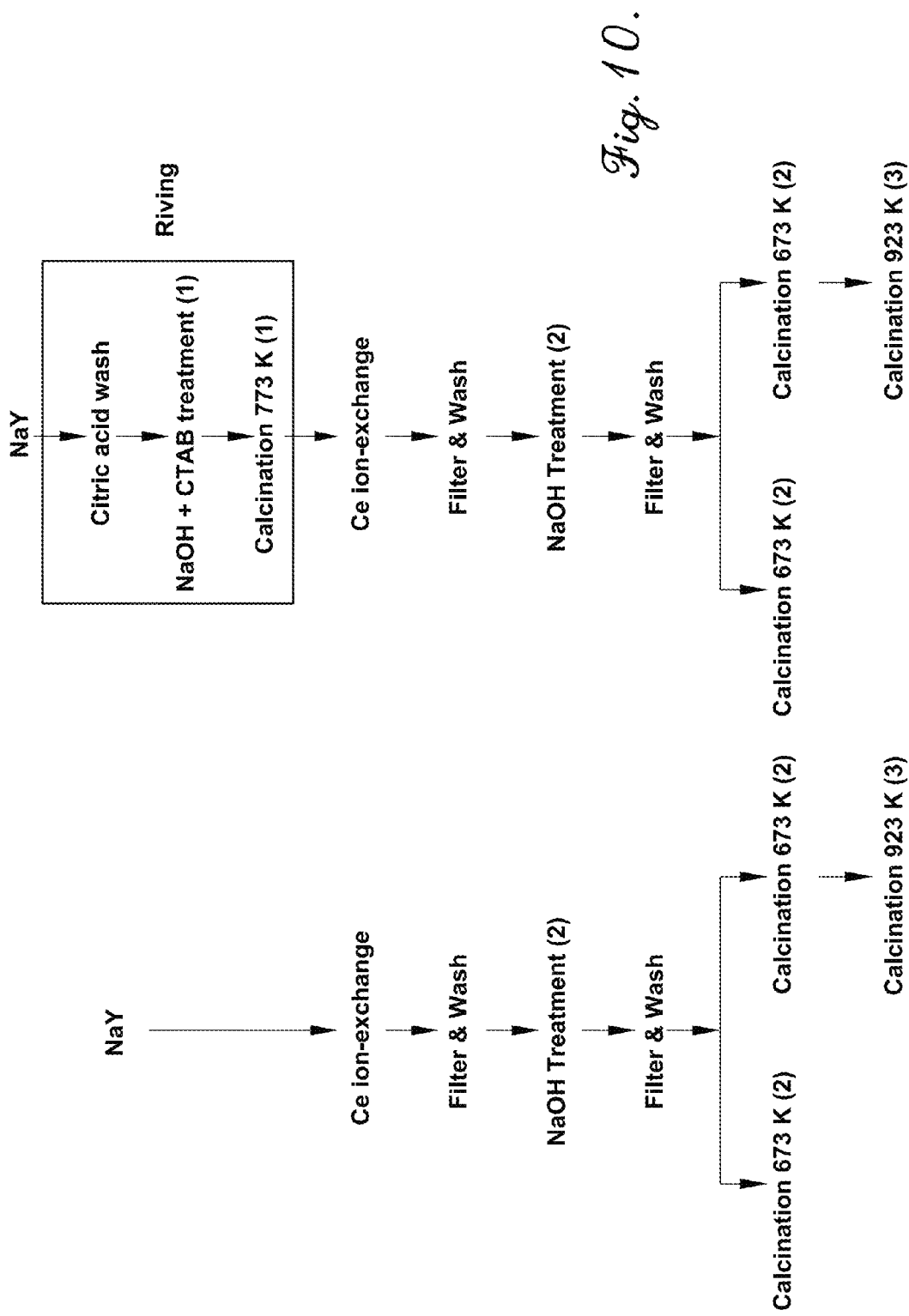
FIG. 10 is a flow diagram depicting the process steps of Example 2.

Zeolite-encapsulated cerium oxide nanoparticles were then synthesized by the following procedure. In the first step, Ce(III) cations were introduced into the zeolite by ion-exchange at 353 K (80° C.) in an aqueous solution of cerium nitrate (100 ml, 5% cerium) for 24 hours. The exchanged zeolite was filtered, thoroughly washed with deionized water, and then dried. In the following step, the exchanged zeolite was treated with NaOH solutions (0.1 M) at room temperature. After treating for 1 hour, the sample was recovered by filtration, washed thoroughly with deionized water, dried, and subjected to calcination in air. The calcination was performed at a temperature of 673 K (400° C.) for 6 hours. In some samples, the calcination temperature was increased to 923 K (650° C.) in order to investigate the effect of the calcination temperature on nanoparticle migration to the zeolite surface and its subsequent growth. The overall process flow diagram of this example is depicted in FIG. 10, with the comparative process being depicted on the left and the inventive process being depicted on the right.

Figure 11:
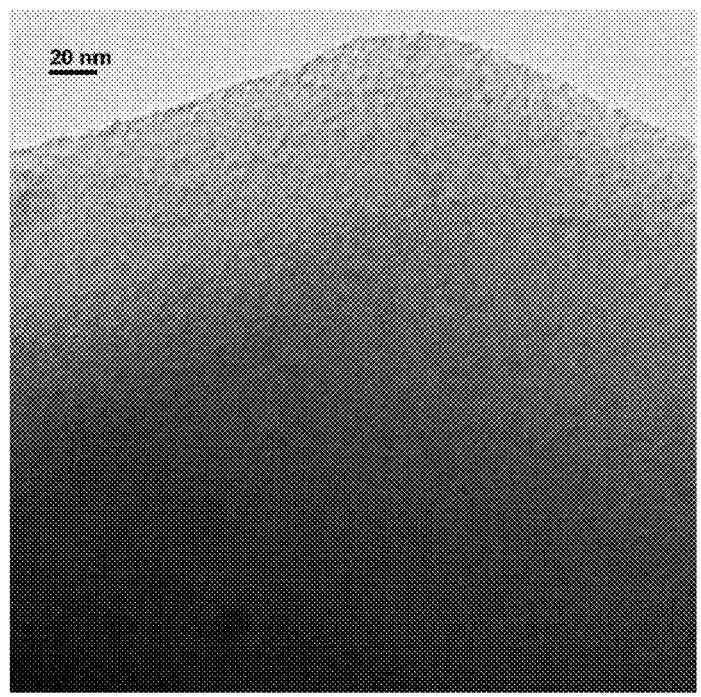
FIG. 11 is a high magnification TEM micrograph of a conventional non-mesoporous NaY zeolite as prepared in Example 2 before calcination.
Figure 12:
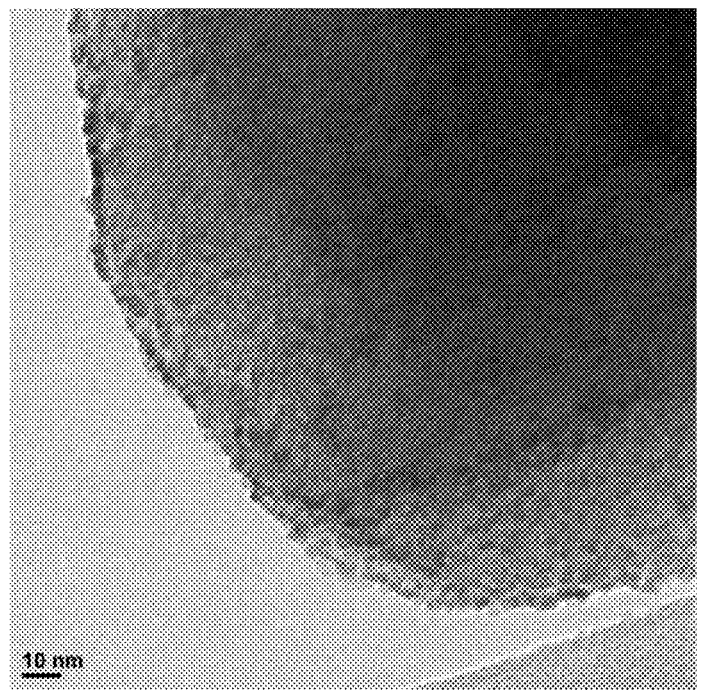
FIG. 12 is a high magnification TEM micrograph of the conventional non-mesoporous NaY zeolite as prepared in Example 2 after being calcined at 923 K.
Figure 13:
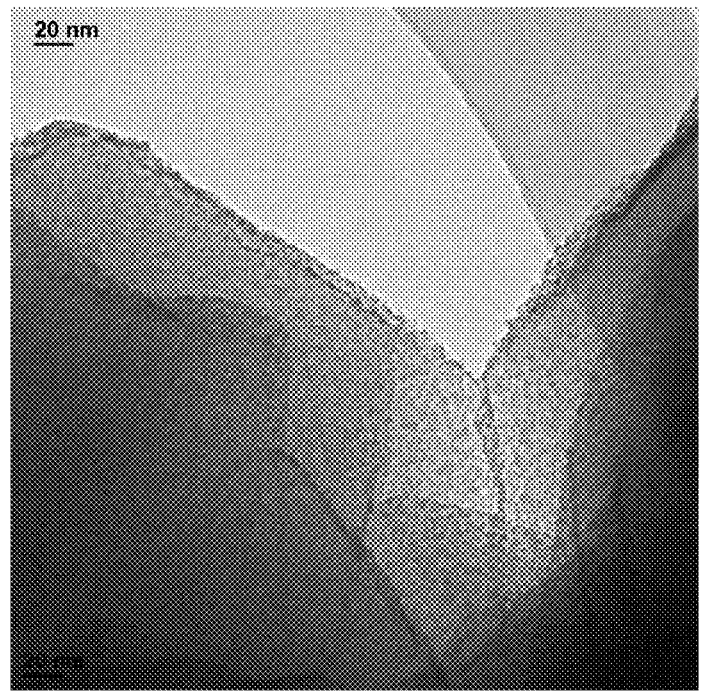
FIG. 13 is a high magnification TEM micrograph of the conventional non-mesoporous NaY zeolite as prepared in Example 2 after being calcined at 923 K.

FIG. 11 shows the comparative cerium oxide/non-mesoporous NaY material after filtering and washing, but before calcination. As shown in FIG. 11, the nanoparticles are highly dispersed throughout the entire zeolite crystal and are so small that they cannot be seen. FIGS. 12 and 13 depict the comparative cerium oxide/non-mesoporous NaY materials after they have been calcined at 923 K. As can be seen in FIGS. 12 and 13, large agglomerations of the nanoparticles have migrated to and accumulated on the external surface of the zeolite and are now visible. Consequently, this migration and accumulation of nanoparticles on the surface of the zeolite negatively impacts the surface area and dispersion of the catalytic nanoparticles within the zeolite support, thereby reducing their overall catalytic activity.

Figure 14:
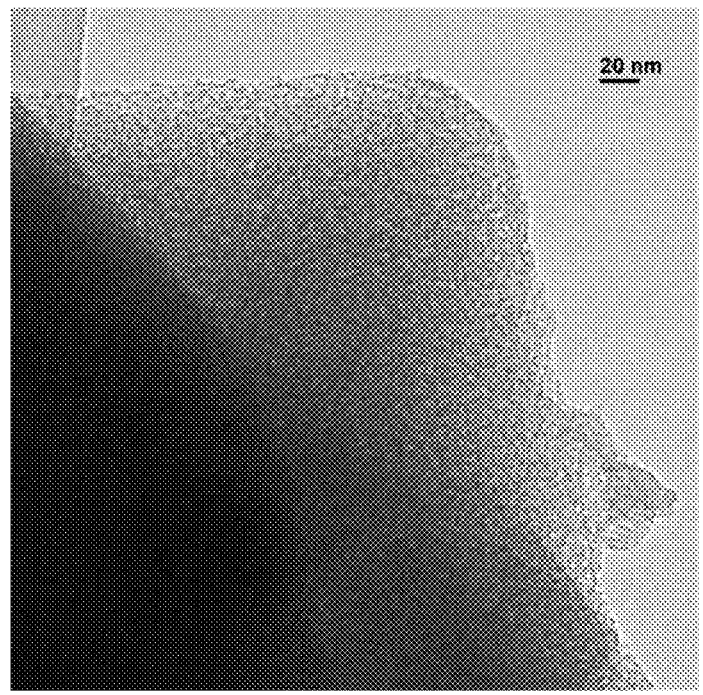
FIG. 14 is a high magnification TEM micrograph of an inventive mesoporous NaY zeolite as prepared in Example 2 before calcination.
Figure 15:
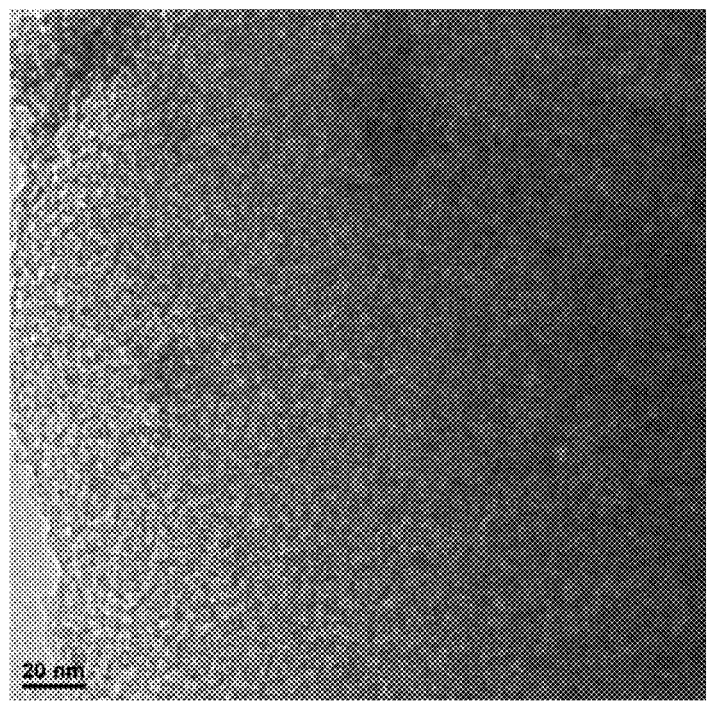
FIG. 15 is a high magnification TEM micrograph of the inventive mesoporous NaY zeolite as prepared in Example 2 after being calcined at 923 K.
Figure 16:
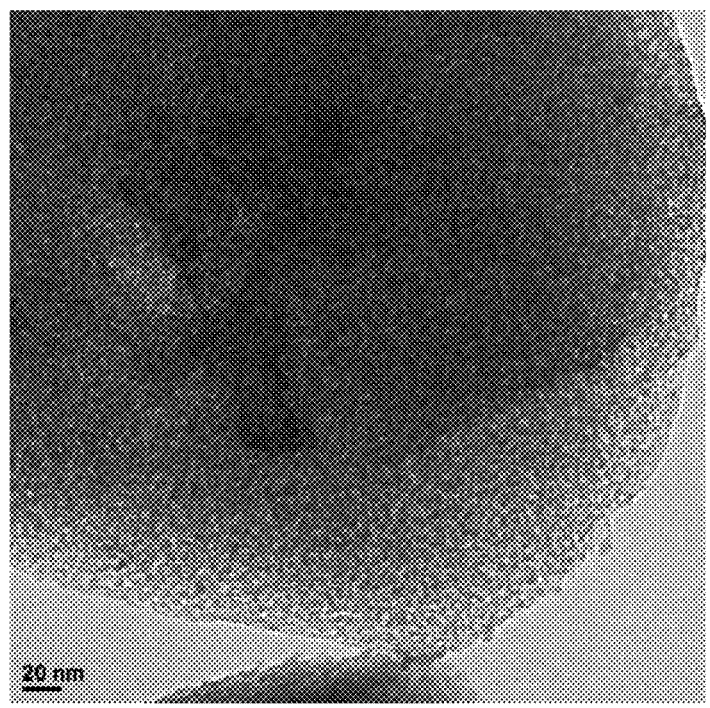
FIG. 16 is a high magnification TEM micrograph of the inventive mesoporous NaY zeolite as prepared in Example 2 after being calcined at 923 K.

FIG. 14 shows the inventive cerium oxide/mesoporous NaY material after filtering and washing, but before calcination. As shown in FIG. 14, the nanoparticles are highly dispersed throughout the entire zeolite crystal and are so small that they cannot be seen. FIGS. 15 and 16 depict the inventive cerium oxide/mesoporous NaY materials after they have been calcined at 923 K. Unlike the comparative non-mesoporous NaY depicted in FIGS. 12 and 13, the cerium oxide nanoparticles can hardly be seen on external surface of the inventive mesoporous NaY after calcination at 923 K as shown in FIGS. 15 and 16. FIGS. 15 and 16 confirm that the cerium oxide nanoparticles were homogenously dispersed throughout the mesopores of the zeolite and that the presence of mesoporosity accommodated the internal migration of these nanoparticles within the mesopores of the zeolite, thereby significantly suppressing their agglomeration and growth on the surface of the zeolite. In fact, hardly any nanoparticle agglomerations were visible on the external surface of the zeolite in FIGS. 15 and 16.

A common limitation of zeolites as catalysts supports is their ability to accommodate nanoparticles larger than their micropores, which causes undesirable migration of the nanoparticles to the zeolite surface, thereby significantly reducing their catalytic performance. The presence of mesoporosity in zeolites, as shown above, dramatically reduced this limitation of conventional zeolites by allowing the catalyst nanoparticles to aggregate in the mesopores, which provide the surface area and the space necessary to disperse and maintain the catalytic nanoparticles within the zeolite.

Example 3

In this example, nickel oxide nanoparticles were synthesized inside the cages of a zeolite by a method including three steps: (i) ion-exchange of nickel ions into the zeolite, (ii) precipitation of nickel ions with sodium hydroxide within the supercages of the zeolite, and (iii) calcination. Two types of zeolite, a commercial NaY zeolite and a mesoporous NaY zeolite, were analyzed in this example. In addition, two calcination temperatures (673 K and 923 K) were tested to study the effect of mesoporosity on the migration and agglomeration of the catalyst nanoparticles, which negatively affects catalytic performance.

The zeolites used in this study were a commercial NaY zeolite and a modified version thereof that had been subjected to a mesopore formation process ("riving") involving subjecting the zeolite to an acid wash with citric acid and then treatment with NaOH and CTAB at 80° C.

Figure 17:
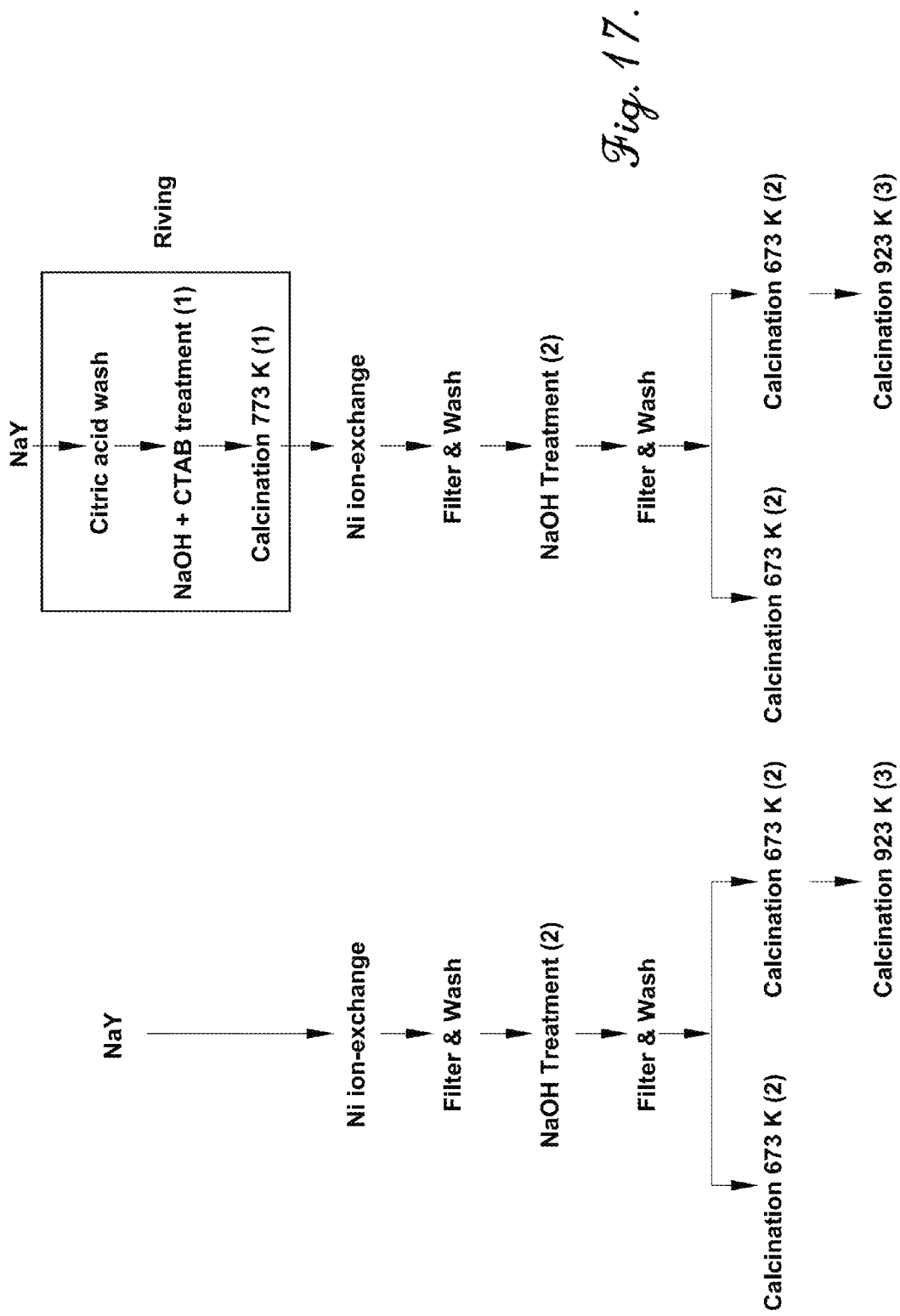
FIG. 17 is a flow diagram depicting the process steps of Example 3.

Zeolite-encapsulated nickel oxide nanoparticles were then synthesized by the following procedure. In the first step, Ni(II) cations were introduced into the zeolite by ion-exchange at 353 K (80° C.) in an aqueous solution of nickel nitrate (100 ml, 5% nickel) for 24 hours. The exchanged zeolite was filtered, thoroughly washed with deionized water, and then dried. In the following step, the exchanged zeolite was treated with NaOH solutions (0.1 M) at room temperature. After treating for 1 hour, the sample was recovered by filtration, washed thoroughly with deionized water, dried, and subjected to calcination in air. The calcination was performed at a temperature of 673 K (400° C.) for 6 hours. In some samples, the calcination temperature was increased to 923 K (650° C.) in order to investigate the effect of the calcination temperature on nanoparticle migration to the zeolite surface and its subsequent growth. The overall process flow diagram of this example is depicted in FIG. 17, with the comparative process being depicted on the left and the inventive process being depicted on the right.

Figure 18:
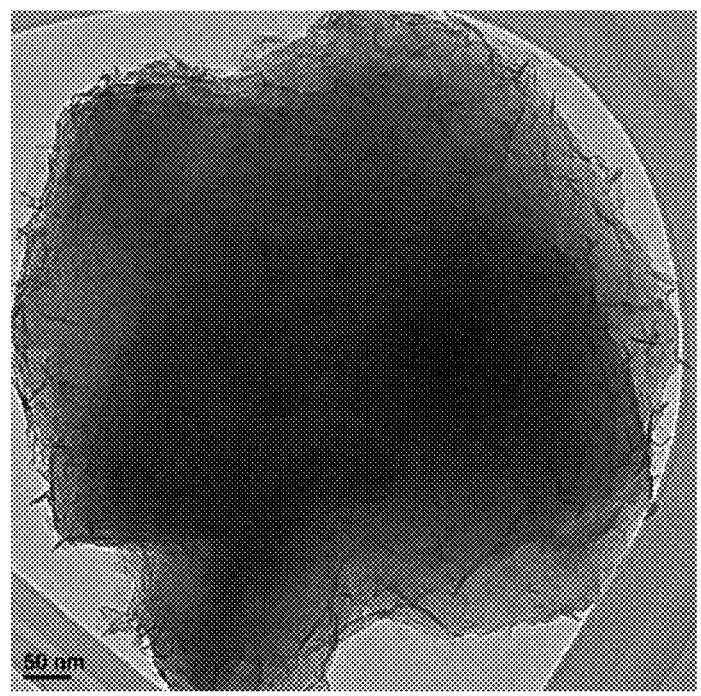
FIG. 18 is a high magnification TEM micrograph of the conventional non-mesoporous NaY zeolite as prepared in Example 3 after being calcined at 673 K.
Figure 19:
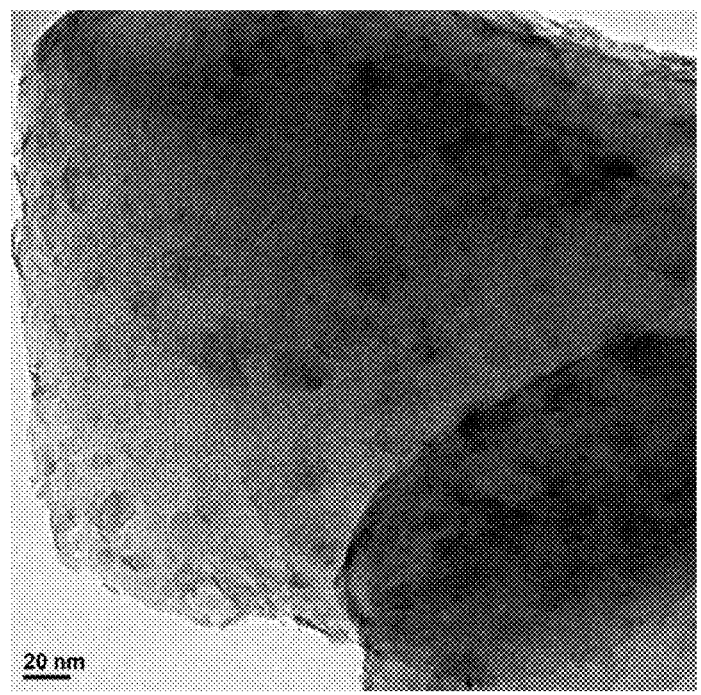
FIG. 19 is a high magnification TEM micrograph of the conventional non-mesoporous NaY zeolite as prepared in Example 3 after being calcined at 923 K.

FIGS. 18 and 19 depict the comparative nickel oxide/non-mesoporous NaY materials after they have been calcined at 673 K and 923 K, respectively. As can be seen in FIGS. 18 and 19, large agglomerations of the nanoparticles have migrated to and accumulated on the external surface of the zeolite. Consequently, this migration and accumulation of nanoparticles on the surface of the zeolite negatively impacts the surface area and dispersion of the catalytic nanoparticles within the zeolite support, thereby reducing their overall catalytic activity.

Figure 20:
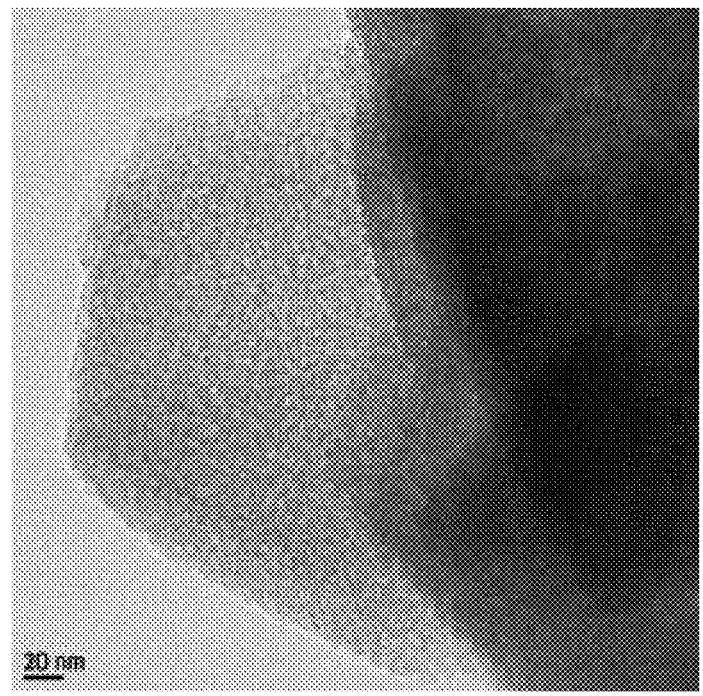
FIG. 20 is a high magnification TEM micrograph of the inventive mesoporous NaY zeolite as prepared in Example 3 after being calcined at 673 K.
Figure 21:
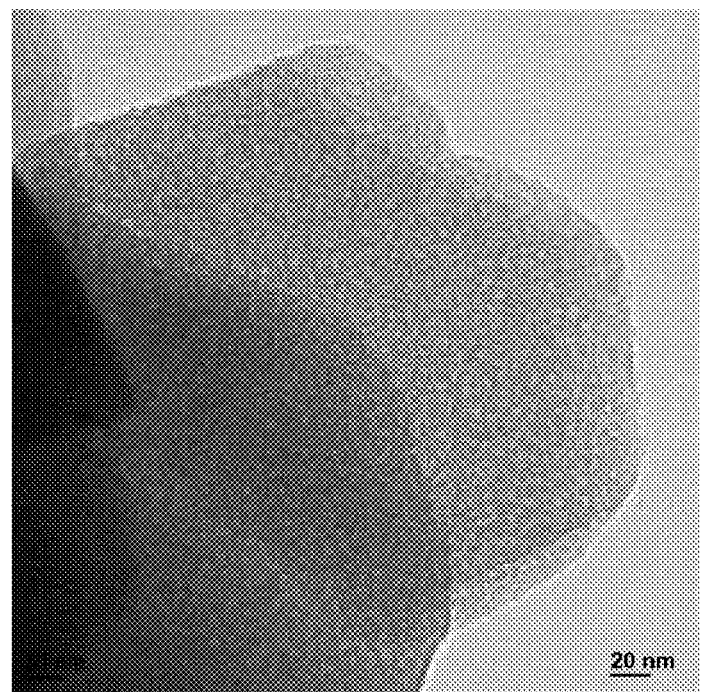
FIG. 21 is a high magnification TEM micrograph of the inventive mesoporous NaY zeolite as prepared in Example 3 after being calcined at 923 K.

FIGS. 20 and 21 depict the inventive nickel oxide/mesoporous NaY materials after they have been calcined at 673 K and 923 K, respectively. Unlike the comparative non-mesoporous NaY depicted in FIGS. 18 and 19, the nickel oxide nanoparticles can hardly be seen on external surface of the mesoporous NaY after calcination at 673 K and 923 K as shown in FIGS. 20 and 21. FIGS. 20 and 21 confirm that the nickel oxide nanoparticles were homogenously dispersed throughout the mesopores of the zeolite and that the presence of mesoporosity accommodated the internal migration of these nanoparticles within the mesopores of the zeolite, thereby significantly suppressing their agglomeration and growth on the surface of the zeolite. In fact, hardly any nanoparticle agglomerations were visible on the external surface of the zeolite in FIGS. 20 and 21.

A common limitation of zeolites as catalysts supports is their ability to accommodate nanoparticles larger than their micropores, which causes undesirable migration of the nanoparticles to the zeolite surface, thereby significantly reducing their catalytic performance. The presence of mesoporosity in zeolites, as shown above, dramatically reduced this limitation of conventional zeolites by allowing the catalyst nanoparticles to aggregate in the mesopores, which provide the surface area and space necessary to disperse and maintain the catalytic nanoparticles within the zeolite.

SELECTED DEFINITIONS

It should be understood that the following is not intended to be an exclusive list of defined terms. Other definitions may be provided in the foregoing description accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise" provided above.

As used herein, the terms "having," "has," and "have" have the same open-ended meaning as "comprising," "comprises," and "comprise" provided above.

As used herein, the terms, "including," "include," and "included" have the same open-ended meaning as "comprising," "comprises," and "comprise" provided above.

Unless otherwise indicated, the term "mesoporous" is art-recognized and refers to a porous material comprising pores with an intermediate size, ranging anywhere from about 2 to about 50 nanometers.

The term "mesostructure" is art-recognized and refers to a structure comprising mesopores which control the architecture of the material at the mesoscopic or nanometer scale, including ordered and non-ordered mesostructured materials, as well as nanostructured materials, i.e., materials in which at least one of their dimensions is in the nanometer size range, such as nanotubes, nanorings, nanorods, nanowires, nanoslabs, and the like.

"Y" represents a faujasite zeolite comprising at least 1.75 moles of silicon per mole of aluminum in its crystal structure. This term also includes the different exchange ion forms of Y.

The term "zeolite" is defined as in the International Zeolite Association Constitution (Section 1.3) to include both natural and synthetic zeolites as well as molecular sieves and other microporous and mesoporous materials having related properties and/or structures. The term "zeolite" also refers to a group, or any member of a group, of structured aluminosilicate minerals comprising cations such as sodium and calcium or, less commonly, barium, beryllium, lithium, potassium, magnesium and strontium; characterized by the ratio (Al+Si):O=approximately 1:2, an open tetrahedral framework structure capable of ion exchange, and loosely held water molecules that allow reversible dehydration. The term "zeolite" also includes "zeolite-related materials" or "zeotypes" which are prepared by replacing $Si^{4+}$ or $Al^{3+}$ with other elements as in the case of aluminophosphates (e.g., MeAPO, SAPO, ElAPO, MeAPSO, and ElAPSO), gallophosphates, zincophophates, and titanosilicates.

What is claimed is:

1. A method for modifying a catalyst composition, said method comprising:
   (a) incorporating one or more catalytic nanoparticles into a mesoporous zeolite to thereby form an initial catalytic zeolite, wherein said mesoporous zeolite has a total 20 to 80 Å diameter mesopore volume in the range of 0.05 to 0.70 cc/g; and
   (b) heating at least a portion of said initial catalytic zeolite at a temperature of at least 150° C. to thereby form a heat-modified catalytic zeolite, wherein at least 20 weight percent of the total amount of said catalytic nanoparticles associated with said heat-modified catalytic zeolite are located within the mesopores of said heat-modified catalytic zeolite.

2. The method of claim 1, wherein at least 75 weight percent of the total amount of said catalytic nanoparticles associated with said heat-modified catalytic zeolite are located within the mesopores of said heat-modified catalytic zeolite.

3. The method of claim 1, wherein said mesoporous zeolite has a total 20 to 80 Å diameter mesopore volume in the range of 0.10 to 0.60 cc/g.

4. The method of claim 1, wherein said mesoporous zeolite is a mesostructured zeolite.

5. The method of claim 1, wherein at least 75 weight percent of said catalytic nanoparticles within the mesopores of said heat-modified catalytic zeolite have an average particle size in the range of 5 to 100 nm as measured using high magnification transmission electron microscopy ("TEM").

6. The method of claim 1, wherein said catalytic nanoparticles comprise a transition metal.

7. The method of claim 6, wherein said transition metal is selected from the group consisting of Ni, Co, W, Mo, Pd, Pt, Ru, Rh, Os, Ir, Nb, and combinations thereof.

8. The method of claim 1, wherein said catalytic nanoparticles comprise cerium oxide, cobalt oxide, nickel oxide, or combinations thereof.

9. The method of claim 1, wherein said incorporating of step (a) comprises subjecting said mesoporous zeolite to ion exchange with one or more ions of said catalytic nanoparticles to thereby form an ion-exchanged catalytic zeolite.

10. The method of claim 1, wherein said incorporating of step (a) comprises contacting said mesoporous zeolite with an acid or base to form said initial catalytic zeolite.

11. The method of claim 1, further comprising combining said heat-modified catalytic zeolite with at least one binder to form a catalyst composition.

12. A method for making a catalyst composition, said method comprising:
   (a) subjecting a mesoporous zeolite to ion-exchange with one or more ions of a catalyst metal to form an ion-exchanged catalytic zeolite, wherein said ion exchange incorporates at least a portion of said catalyst ions into the mesopores of said mesoporous zeolite, wherein said mesoporous zeolite has a total 20 to 80 Å diameter mesopore volume in the range of 0.05 to 0.70 cc/g; and
   (b) contacting said ion-exchanged catalytic zeolite with one or more pH additives to thereby form a catalytic zeolite, wherein at least 20 weight percent of the total amount of said catalyst metal associated with said catalytic zeolite is located within the mesopores of said catalytic zeolite.

13. The method of claim 12, wherein at least 75 weight percent of the total amount of said catalyst metal associated with said catalytic zeolite is located within the mesopores of said catalytic zeolite.

14. The method of claim 12, wherein said mesoporous zeolite has a total 20 to 80 Å diameter mesopore volume in the range of 0.10 to 0.60 cc/g.

15. The method of claim 12, wherein said mesoporous zeolite is a mesostructured zeolite.

16. The method of claim 12, wherein at least 75 weight percent of said catalyst metal within the mesopores of said catalytic zeolite has an average particle size in the range of 5 to 100 nm as measured using high magnification transmission electron microscopy ("TEM").

17. The method of claim 12, wherein said catalyst metal comprises a transition metal selected from the group consisting of Ni, Co, W, Mo, Pd, Pt, Ru, Rh, Os, Ir, Nb, and combinations thereof.

18. The method of claim 12, wherein said ion exchange occurs at a temperature in the range of 25 to 150° C. and for a time period in the range of 1 to 24 hours.

19. The method of claim 12, further comprising (c) calcining at least a portion of said catalytic zeolite at a temperature in the range of 300 to 1,000° C. to form a calcined catalytic zeolite.

20. The method of claim 19, further comprising combining said calcined catalytic zeolite with at least one binder to form a catalyst composition, wherein said binder is selected from the group consisting of alumina, silica, titania, zirconia, clays, boron oxide, and combinations thereof.

21. The method of claim 12, further comprising contacting said catalytic zeolite with hydrogen gas or one or more sulfides in order to at least partially reduce the catalyst metal within said catalytic zeolite into its elemental form.

22. A method for modifying a catalyst composition, said method comprising:
   (a) incorporating one or more catalytic nanoparticles into mesopores of a mesoporous zeolite to thereby form an initial catalytic zeolite, wherein said mesoporous zeolite has a total 20 to 80 Å diameter mesopore volume in the range of 0.05 to 0.70 cc/g; and
   (b) heating at least a portion of said initial catalytic zeolite at a temperature of at least 150° C. to thereby form a heat-modified catalytic zeolite, wherein at least 75 weight percent of said catalytic nanoparticles originally associated with said initial catalytic zeolite are maintained within the mesopores of said heat-modified catalytic zeolite.

23. The method of claim 22, wherein said mesoporous zeolite has a total 20 to 80 Å diameter mesopore volume in the range of 0.10 to 0.60 cc/g.

24. The method of claim 22, wherein said mesoporous zeolite is a mesostructured zeolite.

25. The method of claim 22, wherein at least 75 weight percent of said catalytic nanoparticles within the mesopores of said heat-modified catalytic zeolite have an average particle size in the range of 5 to 100 nm as measured using high magnification transmission electron microscopy ("TEM").

26. The method of claim 22, wherein said catalytic nanoparticles comprise a transition metal selected from the group consisting of Ni, Co, W, Mo, Pd, Pt, Ru, Rh, Os, Ir, Nb, and combinations thereof.

* * * * *